(12) United States Patent
Kelleher

(10) Patent No.: US 12,049,408 B2
(45) Date of Patent: Jul. 30, 2024

(54) CORROSION-RESISTANT COOLANT SALT AND METHOD FOR MAKING SAME

(71) Applicant: TerraPower, LLC, Bellevue, WA (US)

(72) Inventor: Brian C. Kelleher, Seattle, WA (US)

(73) Assignee: TERRAPOWER, LLC, Bellevue, WA (US)

( * ) Notice: Subject to any disclaimer, the term of this patent is extended or adjusted under 35 U.S.C. 154(b) by 921 days.

(21) Appl. No.: 16/571,414

(22) Filed: Sep. 16, 2019

(65) Prior Publication Data

US 2020/0087156 A1 Mar. 19, 2020

Related U.S. Application Data

(60) Provisional application No. 62/731,243, filed on Sep. 14, 2018.

(51) Int. Cl.
 *C01F 5/30* (2006.01)
 *C01D 3/20* (2006.01)

(52) U.S. Cl.
 CPC . *C01F 5/30* (2013.01); *C01D 3/20* (2013.01)

(58) Field of Classification Search
 CPC ................................. C01F 5/30; C01D 3/20
 USPC ....................................................... 423/498
 See application file for complete search history.

(56) References Cited

U.S. PATENT DOCUMENTS

| | | | |
|---|---|---|---|
| 2,375,009 A | 5/1945 | Lepsoe | |
| 2,874,106 A | 2/1959 | Hammond et al. | |
| 2,920,024 A | 1/1960 | Barton et al. | |
| 2,945,794 A | 7/1960 | Winters et al. | |
| 3,018,239 A | 1/1962 | Happell | |
| 3,029,130 A | 4/1962 | Moore | |
| 3,046,212 A | 7/1962 | Anderson | |
| 3,136,700 A | 6/1964 | Poppendiek et al. | |
| 3,216,901 A | 11/1965 | Teitel | |
| 3,218,160 A | 11/1965 | Knighton et al. | |
| 3,262,856 A | 7/1966 | Bettis | |

(Continued)

FOREIGN PATENT DOCUMENTS

| | | |
|---|---|---|
| CA | 631890 A | 11/1961 |
| CN | 105027224 B | 8/2017 |

(Continued)

OTHER PUBLICATIONS

PCT International Preliminary Report on Patentability in International Application PCT/US2019/015967, dated Aug. 13, 2020, 16 pages.

(Continued)

*Primary Examiner* — Anita Nassiri-Motlagh
(74) *Attorney, Agent, or Firm* — Merchant and Gould, PC

(57) ABSTRACT

This document describes a method for reducing the corrosivity of certain magnesium salts. The salt product resulting from the method exhibits reduced corrosion of steels that come into contact with the salt relative to salt compositions that are not so treated. This makes such treated salts more efficient coolant salts as they will require less equipment replacement over time. The method uses magnesium metal to reduce unwanted impurities in the salts the reduced impurities are then removed as either gas or precipitate from the now purified salt. Without being bound to one particular theory, it is believed that the reduction of the level of impurities in the salt results in a salt with substantially reduced corrosiveness to steel.

15 Claims, 8 Drawing Sheets

(56) References Cited

U.S. PATENT DOCUMENTS

| | | | |
|---|---|---|---|
| 3,287,225 | A | 11/1966 | Ackroyd et al. |
| 3,383,285 | A | 5/1968 | Ackroyd et al. |
| 3,450,198 | A | 6/1969 | Brunner |
| 3,785,924 | A | 1/1974 | Notari |
| 3,909,351 | A | 9/1975 | Tilliette |
| 3,996,099 | A | 12/1976 | Faugeras |
| 3,997,413 | A | 12/1976 | Fougner |
| 4,039,377 | A | 8/1977 | Andrieu |
| 4,045,286 | A | 8/1977 | Blum |
| 4,056,435 | A | 11/1977 | Carlier |
| 4,076,602 | A * | 2/1978 | Wheeler ............... C25C 7/005 205/411 |
| 4,175,613 | A | 11/1979 | Chubb |
| 4,216,821 | A | 8/1980 | Robin |
| 4,342,721 | A | 8/1982 | Pomie |
| 4,397,778 | A | 8/1983 | Lloyd |
| 4,762,667 | A | 8/1988 | Sharbaugh |
| 5,185,120 | A | 2/1993 | Fennern |
| 5,196,159 | A | 3/1993 | Kawashima |
| 5,223,210 | A | 6/1993 | Hunsbedt |
| 5,380,406 | A | 1/1995 | Horton |
| 5,421,855 | A | 6/1995 | Hayden |
| 6,181,759 | B1 | 1/2001 | Heibel |
| 7,217,402 | B1 | 5/2007 | Miller |
| 8,416,908 | B2 | 4/2013 | Mann |
| 8,594,268 | B2 | 11/2013 | Shu |
| 8,734,738 | B1 | 5/2014 | Herrmann |
| 9,171,646 | B2 | 10/2015 | Moses et al. |
| 10,043,594 | B2 | 8/2018 | Scott |
| 10,438,705 | B2 | 10/2019 | Cheatham |
| 10,497,479 | B2 | 12/2019 | Abbott et al. |
| 10,566,096 | B2 | 2/2020 | Czerwinski et al. |
| 10,867,710 | B2 | 12/2020 | Cisneros et al. |
| 2003/0015434 | A1 * | 1/2003 | Urquhart ............... C25C 3/04 205/404 |
| 2004/0114703 | A1 | 6/2004 | Bolton |
| 2005/0220251 | A1 | 10/2005 | Yokoyama |
| 2008/0310575 | A1 | 12/2008 | Cinotti |
| 2011/0222642 | A1 | 9/2011 | Gautier |
| 2011/0286563 | A1 | 11/2011 | Moses |
| 2012/0051481 | A1 | 3/2012 | Shu |
| 2012/0056125 | A1 | 3/2012 | Raade |
| 2012/0183112 | A1 | 7/2012 | Leblanc |
| 2012/0288048 | A1 | 11/2012 | Mann |
| 2012/0314829 | A1 | 12/2012 | Greene |
| 2013/0083878 | A1 | 4/2013 | Massie |
| 2013/0180520 | A1 | 7/2013 | Raade |
| 2013/0272470 | A1 | 10/2013 | Whitten et al. |
| 2014/0166924 | A1 | 6/2014 | Raade |
| 2014/0348287 | A1 | 11/2014 | Huke et al. |
| 2015/0010875 | A1 | 1/2015 | Raade |
| 2015/0117589 | A1 | 1/2015 | Kamei |
| 2015/0036779 | A1 | 2/2015 | Leblanc |
| 2015/0078504 | A1 | 3/2015 | Woolley |
| 2015/0170766 | A1 | 6/2015 | Singh et al. |
| 2015/0228363 | A1 | 8/2015 | Dewan et al. |
| 2015/0243376 | A1 | 8/2015 | Wilson |
| 2015/0357056 | A1 | 12/2015 | Shayer |
| 2016/0005497 | A1 | 1/2016 | Scott |
| 2016/0189806 | A1 | 6/2016 | Cheatham, III et al. |
| 2016/0189812 | A1 | 6/2016 | Czerwinski |
| 2016/0189813 | A1 | 6/2016 | Cisneros |
| 2016/0196885 | A1 | 7/2016 | Singh |
| 2016/0217874 | A1 | 7/2016 | Dewan |
| 2016/0260505 | A1 | 9/2016 | Cadell et al. |
| 2016/0260509 | A1 | 9/2016 | Kim et al. |
| 2017/0084355 | A1 | 3/2017 | Scott |
| 2017/0092381 | A1 | 3/2017 | Cisneros |
| 2017/0117065 | A1 | 4/2017 | Scott |
| 2017/0213610 | A1 | 7/2017 | Sumita et al. |
| 2017/0301413 | A1 | 10/2017 | Cisneros |
| 2017/0301421 | A1 | 10/2017 | Abbott |
| 2017/0316840 | A1 | 11/2017 | Abbott |
| 2017/0316841 | A1 | 11/2017 | Abbott et al. |
| 2017/0337995 | A1 * | 11/2017 | Anderson ............... G21F 9/02 |
| 2018/0019025 | A1 | 1/2018 | Abbott et al. |
| 2018/0047467 | A1 | 2/2018 | Czerwinski |
| 2018/0068750 | A1 | 3/2018 | Cisneros |
| 2018/0137944 | A1 | 5/2018 | Abbott |
| 2018/0277260 | A1 | 9/2018 | Marcille et al. |
| 2019/0237205 | A1 | 8/2019 | Abbott |
| 2019/0311816 | A1 | 10/2019 | Sumita et al. |
| 2020/0027590 | A1 | 1/2020 | Cisneros |
| 2020/0118698 | A1 | 4/2020 | Cheatham |
| 2020/0122109 | A1 | 4/2020 | Kruizenga |
| 2020/0185114 | A1 | 6/2020 | Abbott |
| 2020/0211724 | A1 | 7/2020 | Cisneros et al. |
| 2020/0251231 | A1 | 8/2020 | Czerwinski et al. |

FOREIGN PATENT DOCUMENTS

| | | |
|---|---|---|
| CN | 107112055 | 9/2020 |
| DE | 1112791 | 8/1961 |
| DE | 1439107 | 2/1969 |
| EP | 0617430 | 9/1994 |
| FR | 2296248 | 7/1976 |
| GB | 739968 | 11/1955 |
| GB | 835266 | 5/1960 |
| GB | 964841 | 7/1964 |
| GB | 2073938 | 10/1981 |
| GB | 2508537 | 12/2014 |
| JP | S57 1991 | 1/1982 |
| JP | 1991282397 | 12/1991 |
| JP | 2001-133572 | 5/2001 |
| JP | 2014-119429 | 6/2014 |
| RU | 57040 U1 | 9/2006 |
| RU | 2424587 C1 | 7/2011 |
| RU | 2654044 C2 | 5/2018 |
| SU | 1594197 A1 | 9/1990 |
| WO | WO 2013/116942 | 8/2013 |
| WO | WO 2014/0128457 | 8/2014 |
| WO | 2014/196338 | 12/2014 |
| WO | WO 2013/180029 | 5/2015 |
| WO | WO 2014/074930 | 5/2015 |
| WO | WO 2015/140495 | 9/2015 |
| WO | WO 2016/109565 | 7/2016 |
| WO | WO 2018013317 | 1/2018 |

OTHER PUBLICATIONS

PCT International Preliminary Report on Patentability in International Application PCT/US2019/021791, dated Sep. 24, 2020, 9 pages.

Clarno, K.T. et al., "Trade studies for the liquid-salt-cooled very high-temperature reactor: fiscal year 2006 progress report", ORNL/TM-2006 140 (2007), 35 pgs.

Kimura, "Neutron spectrum in small iron pile surrounded by lead reflector", Journal of Nucear Science and Technology 15, No. 3 (1978): 183-191.

PCT International Search Report and Written Opinion in International Application PCT/US2019/051345, dated Mar. 5, 2020, 15 pages.

Wang, Jun-Wei et al., "Influence of MgC12content on corrosion behavior of GH1140 in molten naCl—MgC12as thermal storage medium", Solar Energy Materials and Solar Cells, Elsevier Science Pub., Amsterdam, NL, vol. 179, Nov. 20, 2017, pp. 194-201.

PCT International Search Report and Written Opinion in International Application PCT/US2019/021791, dated Nov. 19, 2019, 15 pages.

PCT International Search Report and Written Opinion in International Application PCT/US2019/015967, dated Jun. 12, 2019, 25 pages.

Holcomb, et al. "Fast Spectrum Molten Salt Reactor Options", Jul. 2011, 46 pages. Available at: http://info.ornl.gov/sites/publications/files/Pub29596.pdf.

Kramer et al., Fusion-Fission Blanket Options for the LIFE Engine, Fusion Science and Technology, vol. 60, pp. 72-77, Jul. 2011.

Kramer et al., Parameter study of the LIFE engine nuclear design, Energy Conversion and Management, 51, pp. 1744-1750, 2010.

(56) References Cited

OTHER PUBLICATIONS

PCT International Search Report and Written Opinion in International Application PCT/US2016/055001, dated Jan. 25, 2017, 11 pages.

Mourogov et al., Potentialities of the fast spectrum molten salt reactor concept: REBUS-3700, Energy Conversion and Management, Mar. 30, 2006, vol. 47, No. 17, pp. 2761-2771.

PCT International Search Report and Written Opinion in International Application PCT/US2017/030666 dated Jul. 20, 2017, 11 pages.

Abbott et al., Thermal and Mechanical Design Aspects of the LIFE Engine, Fusion Science and Technology Dec. 2008; 56(2), 7 pages.

Harder, et al. "Compatibility and Processing Problems in the Use of Molten Uranium Chloride-Alkali Chloride Mixtures as Reactor Fuels", UKAEA, Atomic Energy Research Establishment, Harwell, England, 1969, 28 pages.

PCT International Preliminary Report on Patentability in International Application PCT/US2017/030666 dated Nov. 6, 2018, 9 pages.

PCT International Preliminary Report on Patentability in International Application PCT/US2016/055001, dated Apr. 12, 2018, 9 pages.

Donnelly et al., Fabrication of Heat Exchanger Tube Bundle for the Molten-Salt Reactor Experiment, ORNL-3500, Dec. 9, 1963, 42 pgs.

PCT International Preliminary Report on Patentability in International Application PCT/US2017/030455, dated Nov. 6, 2018, 17 pages.

PCT International Preliminary Report on Patentability in International Application PCT/US2017/030457, dated Nov. 15, 2018, 15 pages.

PCT International Search Report and Written Opinion in International Application PCT/US2017/030455, dated Jan. 30, 2018, 23 pages.

PCT International Search Report and Written Opinion in International Application PCT/US2017/030457, dated Jan. 23, 2018, 20 pages.

Andreades et al., Technical Description of the Mark 1 Pebble-Bed Fluoride-Salt-Cooled High-Temperature Reactor (PB-FHR) Power Plant, Department of Nuclear Engineering, University of California, Berkeley (Sep. 30, 2014), 153 pages.

ASTM International, Designation: B898-11, Standard Specification for Reactive and Refractory Metal Clad Plate (Sep. 2011), 15 pages.

Cohen et al., "Vanadium-Lined HT9 Cladding Tubes", Argonne National Lab ANL/ET/CP-80384, (Feb. 1994), 12 pgs.

European Extended Search Report for EP 15876187.4 dated Sep. 11, 2018, 10 pages.

Forsberg et al., Fluoride-Salt-Cooled High-Temperature Reactor (FHR) Commercial Basis and Commercialization Strategy, MIT Center for Advanced Nuclear Energy Systems, MIT-ANP-TR-153, Dec. 2014, 148 pgs.

Forsberg et al., Fluoride-Salt-Cooled High-Temperature Reactor (FHR) for Power and Process Heat, Final Project Report, MIT-ANP-TR-157, Dec. 2014, 62 pgs.

Forsberg et al., Fluoride-Salt-Cooled High-Temperature Reactor (FHR): Goals, Options, Ownership, Requirements, Design, Licensing, and Support Facilities, MIT Center for Advanced Nuclear Energy Systems, MIT-ANP-TR-154, Dec. 2014, 217 pgs.

Forsberg, Appendix D: Test Reactor Workshop Conclusions, NEUP Integrated Research Project Workshop 6: Fluoride Salt-Cooled High Temperature Reactor (FHR) Test Reactor Goals; Designs, and Strategies, Oct. 2-3, 2014, 11 pages.

Freeman et al., "Archimedes Plasma Mass Filter", AIP Cont. Proc. 694, 403 (2003), 9 pages.

GEN IV International Forum, Molten Salt Reactor (MSR), https://www.gen-4.org/gif/jcms/c_9359/msr, accessed Feb. 26, 2016, 3 pgs.

Grimes, W.R., "Molten-Salt Reactor Chemistry" Nucl. Appl. Technol. 8(137) (1970), 19 pgs.

Merle-Lucotte, E., Introduction to the Physics of the Molten Salt Fast Reactor, Thorium Energy Conference 2013 (ThEC13), 2013, 82 pgs.

MSR-FUJI General Information, Technical Features, and Operating Characteristics., pp. 1-30.

Ottewitte, E. H., Cursory First Look at the Molten Chloride Fast Reactor as an Alternative to the Conventional BATR Concept, 1992, 75 pgs.

PCT International Search Report and Written Opinion in International Application No. PCT/US2017/030672, dated Sep. 27, 2017, 9 pages.

PCT International Search Report and Written Opinion in International Application PCT/US2015/067905 dated Aug. 5, 2016, 18 pages.

PCT International Search Report and Written Opinion in International Application PCT/US2015/067923, dated Apr. 19, 2016, 10 pages.

Reactor Start-up Procedure. Technical University Dresden. Reactor Training Course. pp. 3-4. <https://tu-dresden.de/ing/maschinenwesen/iet/wket/ressourcen/dateien/akr2/Lehrrnaterialien/start_e.pdf?lang=en>. (Mar. 2015), 21 pgs.

Scott, Ian and Durham John, The Simple Molten Salt Reactor, Practical, safe and cheap, Moltex Energy LLP presentation slides, 19 pgs.

Scott, Ian, Safer, cheaper nuclear: The simple molten salt reactor (Dec. 2, 2014), http://www.ee.co.za/article/safer-cheaper-nuclear-simple-molten-salt-reactor.hlml, 10 pgs.

Taube, et al., Molten Plutonium Chlorides Fast Breeder Reactor Cooled by Molten Uranium Chloride, Annals of Nuclear Science and Engineering, vol. 1, pp. 277-281., 1974.

Thoma, R. E., "Chemical Aspects of MSRE Operations," ORNL-4658, Dec. 1971, 151 pages.

TransAtomic Power Technical White Paper, Mar. 2014, V1 .0.1., (2014), http://www.transatomicpower.com/, 34 pgs.

Van't Eind, R.U.S., Simulation of a Fast Molten Salt Reactor, PSR-131-2011-009, Jul. 2011, 68 pages.

Xu et al., Thorium Energy R&D in China, THEO13, CERN, Oct. 28, 2013, 59 pgs.

Molten Salt Reactor (MSR) Review: Feasibility Study of developing a pilot scale molten salt reactor in the UK, Jul. 2015, Energy Process Development, LTD., www.energyprocessdevelopments.com, 75 pgs.

Ottewitte, E. H., "Configuration of a Molten Chloride Fast Reactor on a Thorium Fuel Cycle to Current Nuclear Fuel Cycle Concerns," Ph.D. dissertation, University of California at Los Angeles, 1982, 310 pgs.

PCT International Search Report and Written Opinion in International Application PCT/US2017/061843, dated Oct. 29, 2018, 23 pages.

PCT International Preliminary Report on Patentability in International Application PCT/US2017/061843, dated May 21, 2019, 13 pages.

PCT International Search Report and Written Opinion in International Application PCT/US2017/038806, dated Oct. 16, 2017, 13 pgs.

PCT International Preliminary Report on Patentability in International Application PCT/US2017/038806, dated Jan. 15, 2019, 7 pgs.

Maltsev et al., "Redox potentials of uranium in molten eutectic mixture of lithium, potassium, and cesium chlorides", Russian Metallurgy, Maiknauka-Interperidica, RU, vol. 2016, No. 8, Dec. 2016, 2 pgs.

Kuznetsov et al., "Electrochemical Behavior and Some Thermodynamic Properties of UC1 [sub 4] and UC1 [sub 3] Dissolved in a LiC1-KC1 Eutectic Melt", Journal of the Electrochemical Society, vol. 152, No. 4, Jan. 2005, 11 pgs.

PCT International Search Report and Written Opinion in International Application PCT/US2017/046139, dated Jan. 17, 2018, 16 pages.

PCT International Preliminary Report on Patentability in International Application PCT/US2017/046139, dated Feb. 12, 2019, 8 pages.

(56) References Cited

OTHER PUBLICATIONS

Ding et al., "Hot Corrosion Behavior of Commercial Alloys in Thermal Energy Storage Material of molten MgCl2/KCl/NaCl Under Inert Atmosphere" Solar Energy Materials and Solar Cells, pp. 1-20 (May 2018).
EESR Extended European Search Report Oct. 27, 2021 in European Application No. 21187359.1 dated Oct. 27, 2021, 7 pages.
Johnson et al., "A Method for the Purification of Molten Chloride Salts" Technical Report ANL-7603, Argonne National Laboratory, Argonne, Illinois (Aug. 1969).
Zheng et al., "High-Temperature Corrosion of Uns N10003 in Molten Li2BeF4 (FLiBe) Salt" Corrosion, vol. 71, No. 20, pp. 1257-1266 (Oct. 2015).
Adamson et al., "Interim Report on Corrosion By Alkali-Metal Fluorides: Way to May 1, 1953" ORNL-2337, Oak Ridge Laboratory, Oak Ridge, Tennessee (Mar. 20, 1959).
Adamson, et al., "Interim Report on Corrosion by Zirconium-Base Fluorides" ORNL-2338 UC-25—Metallurgy and Ceramics, Oak Ridge National Laboratory, Oak Ridge, TN, (Jan. 3, 1961).
Afonichkin et al., "Dynamic Reference Electrode for Investigation of Fluoride Melts Containing Beryllium Difluoride" Journal of Fluorine Chemistry 130: 83-88 (Jul. 2008).
ASTM International "A312/A312M-17 Standard Specification for Seamless, Welded, and Heavily Cold Worked Austenitic Stainless Steel Pipes" ASTM International, West Conshohocken, PA, Mar. 15, 2017.
ASTM International "B407-08a Standard Specification for Nickel-Iron-Chromium Alloy Seamless Pipe and Tube" ASTM International, West Conshohocken, PA, 2019.
ASTM International "Standard Practice for Cleaning, Descaling, and Passivation of Stainless Steel Parts, Equipment, and Systems" ASTM International A380/A380M-17, pp. 1-13, West Conshohocken, PA (Sep. 2017).
Blood "Solubility and Stability of Structural Metal Difluorides in Molten Fluoride Mixtures" ORNL-TM-760, Oak Ridge National Laboratory (Jan. 9, 1964).
Ding et al., "Hot Corrosion Behavior of Commercial Alloys in Thermal Energy Storage Material of molten MgCl2/KCl/NaCl Under Inert Atmosphere" Solar Energy Materials and Solar Cells, pp. 1-20 (May 2018).
Ding et al., "Molten Chloride Salts for Next Generation Concentrated Solar Power Plants: Mitigation Strategies Against Corrosion of Structural Materials" Solar Energy Materials and Solar Cells 193:298-313 (Jan. 30, 2019).
EESR Extended European Search Report dated Oct. 27, 2021 in European Application No. 21187359.1 filed Aug. 9, 2017, 7 pages.
Eiselstein et al., "The Invention and Definition of Alloy 625" Superalloys 718, 625, and Various Derivatives, The Minerals, Metals & Materials Society, pp. 1-14 (1991).
Evans et al., "Corrosion in Polythermal Loop Systems II. A Solid-State Diffusion Mechanism With and Without Liquid Film Effects" ORNL-4575, vol. 2, Oak Ridge National Laboratory, Oak Ridge, Tennessee (Jun. 1971).
Floreen et al., "The Metallurgy of Alloy 625" Superalloys 718, 625, and Various Derivatives, The Minerals, Metals & Materials Society, pp. 13-37 (1994).
Gomez-Vidal et al., "Corrosion of Alloys in a Chloride Molten Salt (NaCl—LiCl) for Solar Thermal Technologies" Solar Energy Materials & Solar Cells 157:234-244 (May 20, 2016).
Guo, et al. "Corrosion in the Molten Fluoride and Chloride Salts and Materials Development for Nuclear Applications" Progress in Materials Science, pp. 1-111 (May 14, 2018).
Hastelloy C-276 alloy (brochure), https://www.haynesintl.com/alloys/alloy-portfolio_/Corrosion-resistant-Alloys/HASTELLOY-C-276-Alloy/principal-features.aspx, Last accessed Feb. 1, 2022, 1 page (2022).
Keiser et al. "The Corrosion Resistance of Type 316 Stainless Steel to Li2BeF4" ORNL-TM-5782, Oak Ridge National Laboratory, Oak Ridge, Tennessee (Apr. 1977).
Koger "Alloy Compatibility with LiF—BeF2 Salts Containing ThF4 and UF4" Technical Paper ORNL-TM-4286, Oak Ridge National Laboratory, Oak Ridge, Tennessee (Dec. 1972).
Koger "Corrosion and Mass Transfer Characteristics of NaBF4—NaF (92-8 mole %) in Hastelloy N" ORNL-TM-3866 Oak Ridge National Laboratory, Oak Ridge, Tennessee (Oct. 6, 1972).
Koger "Effect of FeF2 Addition on Mass Transfer in a Hastelloy N—LiF—BeF2—UF4 Thermal Convection Loop System" ORNL-TM-4188 Oak Ridge National Laboratory, Oak Ridge Tennessee (Dec. 1972).
Koger "Evaluation of Hastelloy N Alloys After Nine Years Exposure to Both a Molten Fluoride Salt and Air at Temperatures from 700 to 560 Degrees C." ORNL-TM-4189, Oak Ridge National Laboratory, Oak Ridge, Tennessee (Dec. 1972).
MacPherson "The Molten Salt Reactor Adventure" Nuclear Science and Engineering 90: 374-380 (1985).
Manly et al., "Aircraft Reactor Experiment—Metallurgical Aspects" AEC Research and Development Report ORNL-2349, Oak Ridge National Laboratory, 1-51 (Dec. 20, 1957).
McCoy "The INOR-8 Story" Review—Oak Ridge National Laboratory 3:35-48 (1969).
Mortazavi et al., "High-Temperature Corrosion of a Nickel-Based Alloy in a Molten Chloride Environment—The Effect of Thermal and Chemical Purifications" Solar Energy Materials and Solar Cells, 236:1-17 (Dec. 16, 2021).
Raiman et al., "Aggregation and Data Analysis of Corrosion Studies in Molten Chloride and Fluoride Salts" Journal of Nuclear Materials, pp. 1-13 (Jul. 16, 2018).
Raseman et al., "Engineering Experience at Brookhaven National Laboratory in Handling Fused Chloride Salts" Associated Universities Inc., Brookhaven National Laboratory, Upton, N.Y. (Jun. 1960).
Ren et al., "Alloy Selection and C-276 Code Design Value Extension for Advanced Molten Salt Technology Test Facilities Experimentation" Proceedings of the ASME 2020 Pressure Vessels & Piping Conference PVP2020, Aug. 3, 2020, Virtual Online, pp. 1-9 (Aug. 2020).
Richardson "Development of Freeze Valve for Use in the MSRE" ORNL-TM-128 Oak Ridge National Laboratory, Oak Ridge, Tennessee (Feb. 28, 1962).
Richardson et al., "Corrosion by Molten Fluorides" AEC Research and Development Report, Oak Ridge National Laboratory, pp. 1-19, (Sep. 1952).
Rosenthal, M.W., et al., "Molten-Salt Reactors—History, Status, and Potential" Nuclear Applications and Technology 8:2, 107-117, May 19, 2017.
Serp et al., "The Molten Salt Reactor (MSR) in Generation IV: Overview and Perspectives" Progress in Nuclear Energy 77: 308-319 (2014).
Shaffer "Preparation and Handling of Salt Mixtures for the Molten Salt Reactor Experiment" ORNL-4616, Oak Ridge National Laboratory, Oak Ridge, Tennessee (Jan. 1971).
Special Metals "The story of the "INCOLOY alloys series," from 800, through 800H, 800HT" https://www.specialmetals.com/documents/technical-bulletins/incoloy/incoloy-alloy-800h-800ht.pdf, pp. 1-16 (Sep. 2004).
Sun et al., "Corrosion Behavior of 316SS and Ni-based Alloys in a Ternary NaCl—KCl—MgCl2 Molten Salt" Solar Energy 171: 320-329 (Jul. 2, 2018).
Susskind et al. "Corrosion Studies for a Fused Salt-Liquid Metal Extraction Process for the Liquid Metal Fuel Reactor" Associated Universities Inc., Brookhaven National Laboratory, Upton, N.Y. (Jun. 30, 1960).
Vidal et al., "Molten Chloride Technology Pathway to Meet the U.S. DOE Sunshot Initiative with Gen3 CSP" AIP Conference Proceedings 2126, 080006, National Renewable Energy Laboratory, Golden Colorado (Jul. 26, 2019).
Vignarooban et al., "Corrosion Resistance of Hastelloys in Molten Metal-Chloride Heat-Transfer Fluids for Concentrating Solar Power Applications" Solar Energy 103:62-69 (Feb. 2014).
Vijayan et al., "On the Steady-State Performance of Natural Circulation Loops" International Journal of Heat and Mass Transfer, vol. 34, No. 9, pp. 2219-2230 (Jul. 18, 1990).

(56) References Cited

OTHER PUBLICATIONS

Vijayan et al., "Scaling Laws for Single-Phase Natural Circulation Loops" Nuclear Engineering and Design 152:331-347 (1994).
Williams "Assessment of Candidate Molten Salt Coolants for the NGNP/NHI Heat-Transfer Loop" ORNL-TM-2006/69, Oak Ridge National Laboratory, Oak Ridge, Tennessee (Jun. 2006).
Zhao "Molten Chloride Thermophysical Properties, Chemical Optimization, and Purification" Technical Report NREL/TP-5500-78047 National Renewable Energy Laboratory, Golden, Colorado, (2020).
Zheng et al., "High-Temperature Corrosion of UNS N10003 in Molten Li2BeF4 (FLiBe) Salt" Corrosion, vol. 71, No. 10, pp. 1257-1266 (Oct. 2015).
Search Report from Russian Patent Office, dated Feb. 21, 2023. Application Nos. 2021108156/04, PCT/US2019/051345.

\* cited by examiner

Ultra dry, commercially available salt causes more apparent mass loss than in house purified salt.

All images at 620°C for 1000 hours with 110°C ΔT. Scales identical.

CORROSION-RESISTANT COOLANT SALT AND METHOD FOR MAKING SAME

CROSS REFERENCE TO RELATED APPLICATIONS

The present application claims the benefit of U.S. Provisional Patent Application No. 62/731,243, titled "CORROSION-RESISTANT COOLANT SALT", filed Sep. 14, 2017 which application is hereby incorporated herein by reference.

INTRODUCTION

Molten salts are often used in industry as a heat transfer fluid, or coolant, especially in conjunction with high temperature processes such as those found in nuclear power plants, concentrating solar thermal power plants, and steel and other metal manufacturing. However, molten salt coolants are often highly corrosive. Prior approaches to reducing the corrosion caused by coolant salts have relied on either continuous exposure to a sacrificial anode in the salt of an easily oxidized and inexpensive metal, such as zinc or magnesium, or purification of the coolant salt via magnesium cadmium alloys. Purification via magnesium cadmium introduces an undesirable cadmium waste stream which must be handled. A submerged sacrificial anode's effective range is not well understood and, in certain circumstances may vigorously generate hydrogen and precipitate particulate in the coolant salt.

BRIEF DESCRIPTION OF DRAWINGS

Various aspects of at least one example are discussed below with reference to the accompanying figures, which are not intended to be drawn to scale. The figures are included to provide an illustration and a further understanding of the various aspects and examples, and are incorporated in and constitute a part of this specification, but are not intended as a definition of the limits of a particular example. The drawings, together with the remainder of the specification, serve to explain principles and operations of the described and claimed aspects and examples. In the figures, each identical or nearly identical component that is illustrated in various figures is represented by a like numeral. For purposes of clarity, not every component may be labeled in every figure.

CORROSION-RESISTANT COOLANT SALT AND METHOD FOR MAKING SAME

Figure 1:
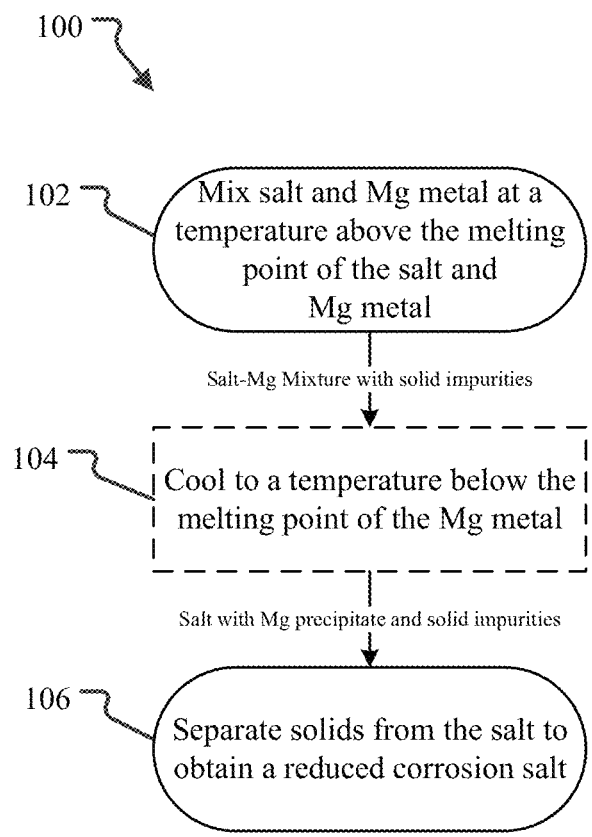
FIG. 1 illustrates, at a high level, a method for reducing the corrosivity of a salt.

This document describes a method for reducing the corrosivity of certain magnesium salts. The salt product resulting from the method exhibits reduced corrosion of steels that come into contact with the salt relative to salt compositions that are not so treated. This makes such treated salts more efficient coolant salts as they will require less equipment replacement over time. The method uses magnesium metal to reduce unwanted impurities in the salts the reduced impurities are then removed as either gas or precipitate from the now purified salt. Without being bound to one particular theory, it is believed that the reduction of the level of impurities in the salt results in a salt with substantially reduced corrosiveness to steel.

DETAILED DESCRIPTION

Before the corrosion-resistant coolant salt compositions and methods of manufacture are disclosed and described, it is to be understood that this disclosure is not limited to the particular structures, process steps, or materials disclosed herein, but is extended to equivalents thereof as would be recognized by those ordinarily skilled in the relevant arts. It should also be understood that terminology employed herein is used for the purpose of describing particular embodiments of the sodium-tin coolant compositions only and is not intended to be limiting. It must be noted that, as used in this specification, the singular forms "a," "an," and "the" include plural referents unless the context clearly dictates otherwise. Thus, for example, reference to "a lithium hydroxide" is not to be taken as quantitatively or source limiting, reference to "a step" may include multiple steps, reference to "producing" or "products" of a reaction should not be taken to be all of the products of a reaction, and reference to "reacting" may include reference to one or more of such reaction steps. As such, the step of reacting can include multiple or repeated reaction of similar materials to produce identified reaction products.

This document describes a method for reducing the corrosivity of a salt. The salt product resulting from the method exhibits reduced corrosion of steels that come into contact with the salt relative to salt compositions that are not so treated. This makes such treated salts more efficient coolant salts as they will require less equipment replacement over time. The embodiments are described in the context of a NaCl—$MgCl_2$ eutectic salt, such as may be used as a molten coolant salt in high temperature (i.e., above the melting point of the salt, in this case 445° C.) heat transfer operations. However, the method is equally applicable to any NaCl—$MgCl_2$ salt composition and pure $MgCl_2$ salt.

Salts for which this method may be suitable include any $MgCl_2$ salt that includes one or more of the following LiCl, NaCl, and KCl. For example, embodiments of low corrosivity salts of $MgCl_2$—NaCl, $MgCl_2$—LiCl, $MgCl_2$—KCl, $MgCl_2$—NaCl—LiCl, $MgCl_2$—NaCl—KCl, $MgCl_2$—NaCl—LiCl—KCl, and $MgCl_2$—KCl—LiCl could be made using this method.

FIG. 1 illustrates, at a high level, a method for reducing the corrosivity of a salt. In the high level embodiment shown, the salt treated by the method 100 will exhibit reduced corrosion of metal components that come into contact with the treated salt relative to the same salt composition that is not so treated.

In the embodiment shown, the method starts with a mixing operation 102 in which the salt to be treated, e.g., NaCl—MgCl$_2$ eutectic, is mixed with an excess of Mg metal at a temperature above the melting temperature of both the salt (in this case, 445° C.) and the Mg (i.e., 650° C.), whichever is higher to create a liquid salt-Mg mixture.

The NaCl—MgCl$_2$ salt to be treated may be obtained from any commercial or private source or created from scratch. Regardless of the source, the NaCl—MgCl$_2$ salt is presumed to include trace amounts of impurities such as chlorides of transition metals, chlorides of other metals, and water. Such impurities include such compounds as water, Fe, FeCl$_3$, Cr, CrCl$_3$, Ni, NiCl$_3$, Cu, CuCl$_3$, V, VCl$_3$, Ti, TiCl$_3$, Mn, MnCl$_2$, Mo, MoCl$_3$, Zn, and ZnCl$_2$. For example, NaCl—MgCl$_2$ having less than 500 ppm of impurities is not commercially available. Rather, various grades of NaCl—MgCl$_2$ salt (e.g., advertised as "99% pure by metals anhydrous" or "ultra dry 99.99% pure") with varying (often unspecified) levels of impurities (e.g., water and oxides and hydroxides of Na, Mg, as well as other cations such as Ni, Cr, and Fe, and chlorides of cations other than Na and Mg) are commercially available.

Impurities are compounds that are not the salts themselves (i.e., neither Na, Cl nor Mg in a NaCl—MgCl$_2$ salt). Impurities may be the result of corrosion of metals during the salt manufacture, or due to poor handling or exposure after manufacture. Regardless, in many cases, the impurities may be in such trace amounts that some or all may be below the detection limits of common analytical methods and, thus, are not reported by the manufacturer. In particular, impurities that are oxygen containing (e.g., Mg(OH)$_2$) are hard to differentiate and identify and are believed to contribute heavily to the corrosivity of a salt. Without being bound to any particular theory, it is believed that the mixing of the liquid Mg metal with the liquid salt causes the Mg metal to react with trace impurities in the salt resulting in the impurities forming insoluble reaction byproducts that can then be easily removed from the salt. It is further believed that it is the impurities in the salt that are the cause of corrosion and this removal of the impurities is what gives the resultant treated salt its improved corrosion performance. For example, it is believed that the Mg metal will react with any trace Mg(OH)$_2$ to produce MgO and hydrogen gas, and with any trace metal chlorides such as nickel, iron, and chromium chloride to reduce them to their base metals. Magnesium oxide, nickel, chromium, and iron are insoluble within the salt.

In the case of NaCl—MgCl$_2$ eutectic and other NaCl—MgCl$_2$ salts having a melting point above the melting temperature of Mg of 650° C., any excess and unreacted Mg metal may also be removed by performing an optional cooling operation 104. In the cooling operation 104 the temperature of the salt and Mg is reduced to below the melting temperature of Mg, thereby causing the excess Mg to precipitate out of the salt. The cooling operation 104 is illustrated in dashed lines to highlight that it is an optional process as some salts may not have a melting point below 650° C. (e.g., 10 mol % MgCl$_2$—90% NaCl which has a melting point of approximately 775° C.) and in some cases the existence of excess Mg in the salt may not be an issue (for example, in a salt composition precursor designed for transit and further processing prior to use as described below).

Regardless of whether the cooling operation 104 is performed, after the mixing, the reacted impurities (e.g., base metals such as nickel, iron, and chromium as well as Mg(OH)$_2$, as well as any gases such as hydrogen or HCl generated during the mixing operation 102) are removed in a separation operation 106. The separation operation 106 may include any physical liquid-liquid or liquid-solid separation technique now known or later developed, such as filtration, settling (gravity separation), centrifugal separation (e.g., via a hydrocyclone or other centrifugal separator) and/or similar. In an embodiment, the separation operation 106 may be a simple filtering of the salt-Mg mixture. In an alternative embodiment, the separation operation 106 may include passing the salt-Mg mixtures through a series of knockout chambers at the same or progressively lower temperatures to allow the insoluble products to be removed from the salt. This allows for fractionation of the impurities if desired. In yet another embodiment, skimming may be performed to remove reacted impurities, if any, that are less dense than the salt. Likewise, gases generated by the mixing operation 102, such as hydrogen gas, may be removed by any conventional method. For example, sparging the salt-Mg mixture with an inert gas, gravity separation, or simple agitation by spinning a mixing blade or impeller in the salt-Mg mixture are various methods that could be used to separate reactive gases from the salt-Mg mixture.

Another gas that is removed by sparging is HCl, which is a byproduct of the reaction of hydrogen from impurities with chloride ions in the salt-Mg mixture. Sparging may be part of the mixing operation 102 or the separation operation 106 or both. For example, in an embodiment the gases are removed via sparging during the mixing operation 102 and the solids are removed as part of the separation operation 106. In an alternative embodiment, the separation may be a two step operation in which the mixture is first sparged for some period of time (from 1 minute to 10 days, such as 30 minutes, 1 hour, 4 hours, 8 hours, 16 hours, 20 hours, 1 day, 1.5 days, 2 days, 2.5 days, 3 days, 5 days, etc. although ranges from 1 hour to 2 days and even 12 hours to 36 hours are considered sufficient) to remove gases and then solids are separated from the mixture through a filtration, gravity separation, centrifugal separation, or any suitable liquid-solid separation technique. The sparging time may be selected based on batch size, equipment size or configuration or any other consideration.

The resulting low corrosion NaCl—MgCl$_2$ salt can be differentiated from the starting salt by its corrosion properties and the remaining impurities relative to the original, untreated NaCl—MgCl$_2$ salt. As mentioned above, the impurity levels may be so low as to require special analysis to compare the impurity differences between the initial salt and the treated salt. Regardless, embodiments of the Mg treatment described herein will produce an identifiably different salt composition by its corrosion performance relative to that of the initial salt. Additionally, a comparison of the redox potential of the treated salt to that of the untreated salt will further allow differentiation between the two.

Finally, in absolute terms through the method above salts, particularly NaCl—MgCl$_2$, having impurity levels at or below 500 mg/kg or parts per million (ppm), 400 mg/kg, 300 mg/kg, 250 mg/kg, 200 mg/kg, 150 mg/kg, 100 mg/kg, 75 mg/kg, 50 mg/kg, 25 mg/kg, 20 mg/kg, 15 mg/kg, 10 mg/kg, and even 5 mg/kg can be obtained. For example, stated another way, salts having between 0.01 and 500 mg/kg, between 0.01 and 400 mg/kg, between 0.01 and 300 mg/kg, between 0.01 and 250 mg/kg, between 0.01 and 200 mg/kg, between 0.01 and 150 mg/kg, between 0.01 and 100 mg/kg, between 0.01 and 75 mg/kg, between 0.01 and 50 mg/kg, between 0.01 and 25 mg/kg, between 0.01 and 20 mg/kg, between 0.01 and 10 mg/kg, and between 0.01 and 5 mg/kg can be obtained.

Figure 2:
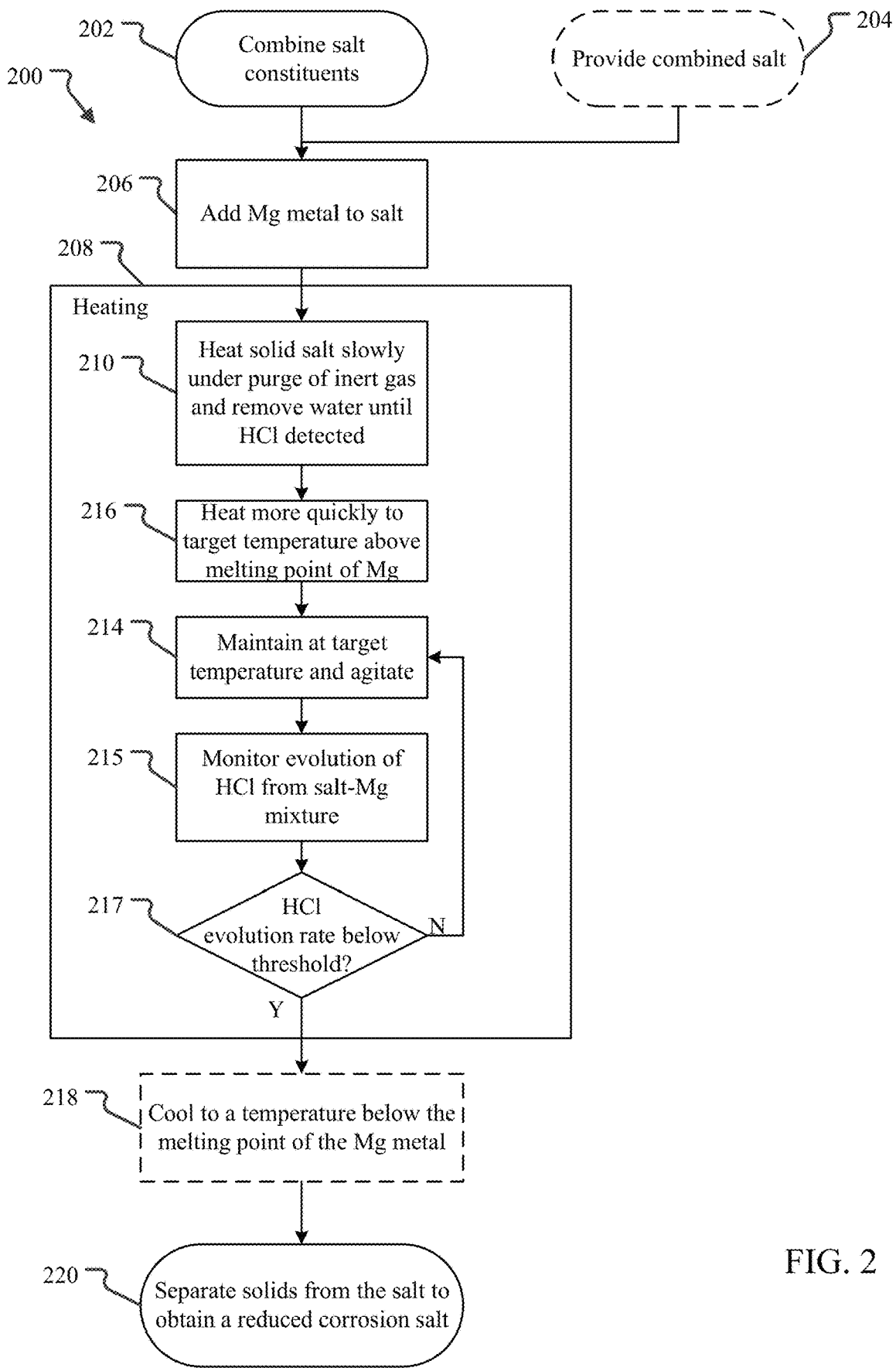
FIG. 2 illustrates a more detailed embodiment of the method of FIG. 1 treating a salt that has a melting point below that of Mg, such as NaCl—$MgCl_2$ eutectic.

FIG. 2 illustrates a more detailed embodiment of the method of FIG. 1 treating a salt that has a melting point below that of Mg, such as NaCl—MgCl$_2$ eutectic. In the embodiment shown, the method 200 can start either with a salt manufacture operation 202 or an alternative obtaining operation 204 in which the salt is obtained from a commercial or other source. In either case, the NaCl—MgCl$_2$ salt is not 100% pure, but rather has at least some impurities of those described above with reference to FIG. 1.

Mg metal is then added to the salt in an addition operation 206. The Mg metal can be of any purity level at or greater than 90%, such as 99% or even 99.9% which is commercially available. In an embodiment, the Mg metal is added as flakes, a rod, or a puck of solid metal to the salt. In an embodiment, a rod of Mg metal may be threaded to a steel rod that is inserted into the salt. After raising the temperature of the salt to above the melting point of the Mg metal, the steel rod may be periodically removed in order to confirm that the Mg metal has been removed from the steel rod.

In an embodiment, any amount of Mg may be added in the addition operation 206 as the resulting treated salt will be better performing than the untreated salt. However, in an embodiment of the method, because the amount of impurities will typically be unknown it is desirable to add an excess of amount of Mg, that is, excess sufficient to remove any anticipated levels of impurities. In an embodiment, an excess amount of Mg is defined as adding at least 1 part by weight Mg metal to 500 parts NaCl—MgCl$_2$ salt. The range of excess amounts of Mg to salt (by weight) are 1 part by weight Mg metal to 500 parts NaCl—MgCl$_2$ salt, 1 Mg to 450 salt, 1 Mg to 400 salt, 1 Mg to 350 salt, 1 Mg to 300 salt, 1 Mg to 250 salt, 1 Mg to 200 salt, 1 Mg to 175 salt, 1 Mg to 150 salt, 1 Mg to 100 salt, 1 Mg to 75 salt, 1 Mg to 50 salt, 1 Mg to 25 salt, 1 Mg to 10 salt, and 1 Mg to 1 salt. This includes any intermediate ranges such as 1 part Mg to 50-450 parts salt, 1 Mg to 100-300 parts salt, 1 Mg to 150-250 parts salt, and any other combination of ratios in the preceding sentence.

Although the addition may be done at such a temperature and pressure that either or both of the Mg metal and the NaCl—MgCl$_2$ salt in the solid or liquid phase, in the embodiment shown it is assumed that the addition is performed under conditions where both the Mg and the salt are solid. Although the Mg addition operation 206 is illustrated before heating, it should be noted that the Mg addition operation 206 can be performed at any time before or after the salt has been heated. For example, the Mg addition operation 206 may be performed after the first heating operation 210 or even after the second heating operation 216, discussed below.

In an embodiment, the addition operation 206 is done in an inert environment, such as in an argon or other inert gas atmosphere. During the addition operation 206 the inert environment may be stagnant or may be under a continuous or semi-continuous purge.

In the embodiment shown, after the addition operation 206 a heating operation 208 is performed. The heating operation 208 heats the Mg metal and the NaCl—MgCl$_2$ salt to a target temperature above the melting point of both the salt and the Mg metal to obtain a liquid Mg-salt mixture in which the Mg metal and the NaCl—MgCl$_2$ salt are in the liquid phase. In the embodiment shown, the heating operation 208 also maintains the salt-Mg metal mixture at or above the target temperature and under agitation for some period time to allow for the Mg metal to react with the impurities.

The heating operation 208 may be done in an appropriate heating vessel while purging the Mg and salt with a flow of inert gas, such as argon. The purge may also be used to remove any gaseous impurities liberated or generated through reaction with the Mg during the heating operation 208. Such gases or vapors may include, for instance, boiled off water, hydrogen, and HCl generated by the reaction of Mg with the impurity Mg(OH)$_2$ and/or other hydroxides as described above.

The heating operation 208 may be performed in several discrete steps for safety depending on the solid/liquid state of the constituents and the constituents used. This may be done to prevent a vigorous release of water from the Mg metal and the NaCl—MgCl$_2$ salt which may occur when the salt transitions from the solid to the liquid phase while containing a large amount of water. In the embodiment shown, as discussed above the salt is NaCl—MgCl$_2$ eutectic (melting point below that of Mg metal) and the Mg metal and the NaCl—MgCl$_2$ eutectic salt are both initially solid.

In this embodiment, an initial slow heating operation 210 raises the temperature of the solid Mg-salt combination to just below the melting point of the salt. This drives off some water from the solid salt. During this initial heating operation 210, the rate of water removed from the vessel by the inert gas purge may be monitored to determine when the rate of water being driven from the salt has been sufficiently reduced. In an embodiment, this determination is made by comparing the water removal rate or some other metric related to the water content in the inert gas purge stream removed from the vessel to a predetermined threshold. When the threshold is determined to have been met, the salt is then heated above its melting point in a second heating operation 216.

In an alternative embodiment, shown, the generation of HCl gas from the salt-Mg mixture is monitored during the initial heating operation 210 instead of or in addition to the water removal. In this embodiment, the heating is done at a slow rate, such as below 10° C./minute, 5° C./minute, 1° C./minute, below 0.1° C./minute, or even below 0.01° C./minute, until the generation of HCl is noted. For example, in an embodiment, gas from the heated vessel is passed through a water bath maintained at a temperature below the boiling point of water so that water gas is collected in the bath. HCl gas can be visibly detected through observation of the water bath for bubbles passing through the bath. Alternatively, an HCl sensor may be provided to determine when HCl is being generated from the salt. Upon detection of significant HCl generation, the heating rate may be increased in order to limit the corrosion caused by the HCl gas to the equipment by transitioning to the second heating operation 216.

In the second heating operation 216, the Mg-salt combination is then heated to a target temperature above which both the Mg metal and NaCl—MgCl$_2$ salt are liquid, thereby obtaining a liquid Mg-salt mixture at or near atmospheric pressure. The target temperature of the Mg-salt mixture obtained by the heating operation 216 may be any temperature at which both the Mg metal and NaCl—MgCl$_2$ salt are liquid. For example, if the salt is NaCl—MgCl$_2$ eutectic (boiling point 445° C.) the final temperature achieved by the second heating operation 216 may be 650° C., 660° C., 670° C., 680° C., 690° C., 700° C., 750° C., 800° C., or even higher. The pressure may be at any pressure, although this will affect the cost and the melting points of the constituents changing the appropriate target temperature as is well known in the art.

The initial heating operation 210, the second heating operation 216, or both may include actively agitating the Mg-salt combination. In an embodiment, this may be achieved by actively purging the inert gas through the vessel and its contents. In an alternative embodiment, this may be done using an agitating device, such as a rotating stirring paddle or an impeller within the salt, or by vibrating the vessel. In the embodiment shown in FIG. 2, the liquid Mg-salt mixture is agitated by directing the purge stream through the liquid contents of the vessel. Any conventional form of agitation, now known or later developed, is contemplated and may be used.

The liquid Mg-salt mixture is then maintained at or above the target temperature for as long as desired in a temperature maintaining operation 214. In an embodiment, it is desired to maintain the temperature at or above the target temperature until it is believed that the Mg metal has fully reacted with the impurities in the salt. In an embodiment, a predetermined amount of time may be selected, for example empirically or based on an expected level of impurities, to ensure the Mg has fully reacted with any impurities. For example, holding the salt-Mg mixture at or above the target temperature for a period of time such as at least 1 minute, 10 minutes, 1 hour, 4 hours, 8 hours, 12 hours, 24 hours or even 48 hours, noting that larger batches may benefit larger holding times.

In an alternative embodiment, instead of selecting a time period to maintain the liquid Mg-salt mixture at or above the target temperature, one or more parameters may be monitored, such as the water removal rate described above, and a determination made based on the monitored parameters that the treatment has sufficiently progressed. For example, in an embodiment, the liquid Mg-salt mixture may be maintained at the final temperature until a visible change in the mixture is observed or until a water removal rate is achieved. In another embodiment, the redox potential of the salt may be monitored and the heating operation 216 terminated when a target level is obtained.

In the embodiment shown, the generation of HCl is used as an indicator of the extent of the reaction between Mg and the impurities. In this embodiment, it is presumed that the reaction is sufficiently complete after the HCl generation has peaked and fallen below some quantitative or qualitative HCl generation threshold.

In the embodiment shown, an HCl monitoring operation 215 is performed during the temperature maintaining operation 214. In an embodiment, simple observation that the amount of bubbles observed passing through the water bath has dropped to below some number of bubbles per period time may be used to monitor the generation of HCl gas from the salt-Mg mixture. In an alternative embodiment, an HCl sensor may be used to quantitatively monitor the HCl leaving the salt-Mg mixture. In yet another embodiment, a flow meter may be used to monitor the amount of total gas exiting the Mg-salt mixture.

Regardless of how the HCl is monitored, a determination operation 217 is performed to determine when the HCl generated from the salt-Mg mixture has fallen to or below a selected threshold. For example, a quantitative threshold could be selected based on the observed flow of bubbles through the water bath and the generation rate of HCl may be monitored until the rate is below a desired threshold. Regardless, through selection of the threshold the impurity level in the treated salt can be controlled with lower thresholds presumed to obtain more pure treated salts. If it is determined that HCl generation is above the threshold, the temperature maintaining operation 214 continues. However, upon reaching the threshold, the reaction is deemed sufficiently complete and the maintaining operation 214 is terminated which, in the embodiment shown, also terminates the overall heating operation 208.

After the heating operation 208, the liquid Mg-salt mixture is then optionally cooled in a cooling operation 218 to a cooled temperature below the melting point of Mg but above the melting point of the salt. This solidifies any excess and unreacted Mg. The final cooling temperature used may be any temperature below the melting point of Mg but above the nominal melting point of the salt, noting that this method may be used for many different salt embodiments for which their melting points will vary. In an embodiment, the final cooling temperature selected is near the melting point of the salt, such as a range between 0.001° C. above the nominal melting point of the salt at a lower end of the range to 5° C., 10° C., 15° C., 20° C., 25° C., 30° C., 40° C., 50° C., or even 100° C. above the salt's nominal melting point at the higher end of the range, as long as the higher end of the range is below the melting point of Mg. The salt may be held within this cooled temperature range for any period of time sufficient to allow some or all of the Mg to solidify.

After the cooling operation 218, the solid Mg and any solid reacted impurities are separated from the salt in separation operation 220 to obtain a treated NaCl—$MgCl_2$ salt composition (which may be referred to alternatively as a magnesium-reduced salt composition, a treated salt composition, a magnesium-treated salt composition, a reduced corrosivity salt composition, or a low corrosion salt composition). In an embodiment, the separation operation 220 includes a settling operation in which the salt is maintained at the final temperature for a period of time to allow solid Mg and impurities to settle out of the salt. In this embodiment, the period of time may be any time period within a range of 1 minute, 10 minutes, or even 1 hour at a lower end of the range to 12 hours, 24 hours or 48 hours at the upper end of the range.

In an embodiment, the separation operation 220 includes passing the Mg-salt composition within the cooled temperature range through a filter to remove any solids entrained in the liquid salt. In this embodiment, the filter may be heated slightly to ensure the salt does not cool during while passing through the filter. The filter may be any suitable filter that will not introduce additional impurities into the salt. In an embodiment, the filter is a stainless steel 40 micron filter. However, filters of any suitable material may be used. In addition, filters with a nominal filter size of less than 500 microns may be used, although filters of from 1 micron to 100 micron are anticipated to be more effective. For example, a nominal 1 micron, 2 micron, 4 micron, 5 micron, 10 micron, 20 micron, 25 micron, or 30 micron filter may be used.

The methods described above could be further adapted to reduce the corrosivity of a salt while it is in use as a coolant. For example, excess magnesium could be added, periodically or continuously, to coolant salts while those salts are in use as heat transfer fluids in a coolant circuit. In an embodiment of this application, some amount of magnesium metal could be introduced directly into a coolant salt stream to reduce its corrosivity "in situ" as it were. In an alternative embodiment, a side stream or batch could be removed from the coolant stream and then treated in a continuous or batchwise manner. In streams where the salt temperature and pressure exceed the melting point of Mg, the Mg could be added to the liquid stream at or just prior to the location where the salt conditions exceed the Mg melting point. The Mg will then promptly melt and be well mixed by the flow of the salt around the coolant circuit. A filter or settling tank could be provided at some cooler point in the circuit to collect and remove any reaction byproducts as described above. A gas removal system, such as headspace in an expansion tank, could also be provided to collect any gaseous byproducts formed from the reaction of the Mg with corrosion products in the coolant circuit.

Alternatively, an existing coolant circuit could be modified to include a magnesium treatment system. In an embodiment, the magnesium treatment system is designed to add Mg metal to the main coolant salt stream or slipstream of coolant salt, heat the mixed stream to ensure the Mg melts into the salt, and then passes the mixed stream through a separator. Such a magnesium treatment system may include an Mg source, a mixer, a heating element, and a separator as either separate components or integrated into a single system. The various components could be sized for a given flow of coolant salt to allow for a specific residence time to ensure adequate contacting and adequate reaction time as necessary to improve the corrosion performance of the salt.

In yet another aspect, to facilitate performance of the above methods, commercial-grade salt could be packaged with some amount of Mg metal and provided as a precursor product to salt users and manufacturers with instructions on how to perform the methods described above in order to create the low corrosion salt composition from the precursor product. In this embodiment, because the salt will be later treated, the salt portion of the product need not be particularly pure. For example, 90%, 95%, or 99.0% pure by metals NaCl—MgCl$_2$ salt could be packaged with Mg metal. In an embodiment, the Mg metal could be separately packaged and included with the NaCl—MgCl$_2$ salt.

Similarly, a precursor product may include 1-500 parts of 90-99.99% NaCl—MgCl$_2$ and 1 part Mg, which may be in the form of Mg metal. This material could be packaged for sale or made in a batch by adding the constituent materials together before, during or after melting and agitation.

Figure 7:
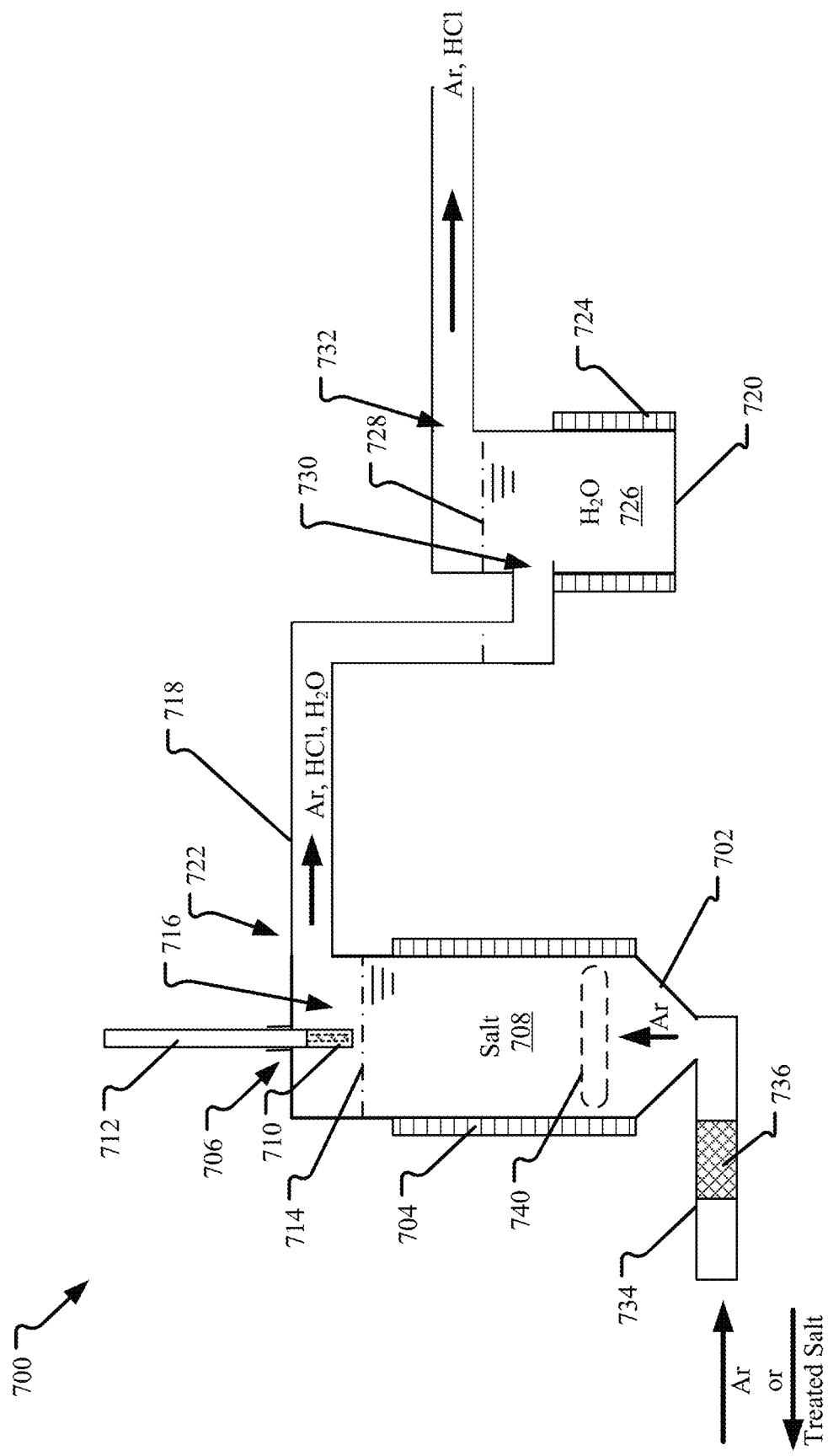
FIG. 7 illustrates a block diagram of an embodiment of a system for treating salt using embodiments of the method provided above.

FIG. 7 illustrates a block diagram of an embodiment of a system 700 for treating salt using embodiments of the method provided above. In the embodiment shown, a heated vessel 702 is provided with an access port 706 through which salt 708 and the Mg metal 710 can be inserted into the vessel 702. The temperature of the vessel 702 is controlled by an external heating jacket 704. In the embodiment shown, the Mg metal 710 is a rod threaded onto a movable steel rod 712 that is inserted through the access port 706 as described above. In this way the Mg metal can be inserted into the salt 708 in the vessel 702 at any time.

During operation, salt 708 fills the vessel up to some level 714 leaving a headspace 716 above the salt 708. An inert gas, in this case argon, is sparged through the salt 708 from below via a transfer line 734. This agitates the liquid salt and Mg metal as well as assisting in the flow of evolved gases from the vessel 702. An optional impeller 740 is also illustrated which could be used to provide additional agitation or could be used in place of the flow of inert gas as the sole source of agitation. Gases exit the vessel 702 through a gas outlet 722 in the headspace 716.

The gas outlet 722 is connected by piping 718 to a water trap 720. The water trap 720 is cooled by a cooling jacket 724 and contains water 726 up to some level 728. The gases from the vessel 702 enter the water trap through a gas inlet 730, bubble through the water 726 and exit via a gas outlet 732. Water is collected in the cooled water trap 720 while argon and HCl pass through to a treatment system (not shown).

A filter 736, such as a stainless steel 40 micron filter as discussed in greater detail below, is provided in the transfer line 734. By passing argon through the filter during sparging, the filter is protected from corrosion until the salt treatment is completed. After the treatment is completed, the treated salt 708 is then removed through the filter 736 via the transfer line 734. This is but one example of a salt treatment system 700 suitable for performing the methods described above.

EXAMPLES

The following process was used to prepare the treated NaCl—MgCl$_2$ salt compositions for corrosion testing against untreated salt compositions. The process started by mixing 99.99% pure by metals, but "anhydrous", magnesium chloride and 99.99% pure by metals sodium chloride to create NaCl—MgCl$_2$ (58-42 mol %) salt in a reaction vessel. The 99.99% pure by metals MgCl$_2$ and NaCl were obtained from commercial sources (Alfa Aesar). Table 1 lists the impurities of commercial constituent salts as reported by the manufacturer.

TABLE 1

| Impurity | In MgCl$_2$ Salt (ppm) | In NaCl Salt (ppm) |
|---|---|---|
| Mg | Matrix | 2 |
| Na | 140 | Matrix |
| Cl | Matrix | Matrix |
| Li | <0.005 | <0.1 |
| Al | 4 | 0.9 |
| Si | 2 | 2 |
| K | 260 | 80 |
| Ca | 6 | 0.3 |
| Cr | <0.01 | <0.1 |
| Fe | 1 | 5 |
| Cu | 0.4 | 0.2 |
| H | ND | <0.2 |
| Be | <0.005 | <0.2 |
| B | 0.2 | <0.2 |
| C | ND | <0.2 |
| N | ND | <0.2 |
| O | ND | <0.2 |
| F | 3 | <0.2 |
| P | 0.5 | <0.2 |
| S | 1 | <0.2 |
| Sc | <0.01 | <0.2 |
| Ti | 3 | <0.2 |
| V | <0.01 | <0.2 |
| Mn | <0.01 | <0.2 |
| Co | <0.02 | <0.2 |
| Ni | <0.02 | <0.2 |
| Zn | <0.05 | <0.2 |
| Ga | <0.05 | <0.2 |
| Ge | <0.05 | <0.2 |
| As | <0.05 | <0.2 |
| Se | <0.05 | <0.2 |
| Br | ND | <0.2 |
| Rb | <0.05 | <0.2 |
| Sr | <0.05 | <0.2 |
| Y | <0.05 | <0.2 |
| Zr | <0.05 | <0.2 |
| Nb | <0.05 | <0.2 |
| Mo | <0.05 | <0.2 |
| Ru | <0.05 | <0.2 |
| Rh | <0.05 | <0.2 |
| Pd | <0.05 | <0.2 |
| Ag | <0.05 | <0.2 |
| Cd | <0.05 | <0.2 |
| In | <0.05 | <0.2 |
| Sn | <0.05 | <0.2 |

TABLE 1-continued

| Impurity | In MgCl$_2$ Salt (ppm) | In NaCl Salt (ppm) |
|---|---|---|
| Sb | <0.05 | <0.2 |
| Te | <0.05 | <0.2 |
| I | ND | <0.2 |
| Cs | <0.1 | <0.2 |
| Ba | <0.1 | <0.2 |
| La | <0.1 | <0.2 |
| Ce | <0.1 | <0.2 |
| Pr | <0.1 | <0.2 |
| Nd | <0.1 | <0.2 |
| Sm | <0.1 | <0.2 |
| Eu | <0.1 | <0.2 |
| Gd | <0.1 | <0.2 |
| Tb | <0.1 | <0.2 |
| Dy | <0.1 | <0.2 |
| Ho | <0.1 | <0.2 |
| Er | <0.1 | <0.2 |
| Tm | <0.1 | <0.2 |
| Yb | <0.1 | <0.2 |
| Lu | <0.1 | <0.2 |
| Hf | <0.1 | <0.2 |
| Ta | ND | <0.2 |
| W | <0.2 | <0.2 |
| Re | <0.2 | <0.2 |
| Os | <0.2 | <0.2 |
| Ir | <0.2 | <0.2 |
| Pt | <0.2 | <0.2 |
| Au | <0.2 | <0.2 |
| Hg | <0.2 | <0.2 |
| Tl | <0.2 | <0.2 |
| Pb | <0.2 | <0.2 |
| Bi | <0.2 | <0.2 |
| Th | <0.2 | <0.2 |
| U | <0.2 | <0.2 |

The salts were mixed in a glovebox under an argon sparge at 1 PSIG to obtain a starting NaCl—MgCl$_2$ mixture. Mg metal was then added to the salt mixture in the form of flaked Mg or coupons of Mg physically placed on top of the salt mixture. The placement of the Mg was to allow the subsequent melting of the Mg to be visually confirmed. In this experiment, 2.5 grams of Mg was added to 430 grams of NaCl—MgCl$_2$ mixture.

Water was then removed from this salt mixture by slowly heating a volume of the salt in a pressure vessel under a purge of argon through the salt. This slow purge carries away water, while simultaneously removing corrosive gaseous byproducts (HCl). In the system used, the purge flow was routed through the eventual transfer arm, which has the salt filter in line. By purging argon through the line, the filter's integrity is preserved. Water removal can take several hours.

The rate of water removed from the salt was monitored by separating the water from the purge gas and, after the water removal rate slowed, the salt was transitioned through the salt's melting point. This typically resulted in a 'burp' of water outgassing. Purging was continued through this step. As the salt fully melted the mixture was observed to be bubbling as the argon passes through the melt. This visually confirming the agitation of the salt. After passing through the salt's melting point, the temperature in the reaction vessel was increased up to 700° C.

As the contents of the vessel passed through the temperature of 650° C., the magnesium became molten. As the magnesium melts it was observed to puddle up on top of the salt. Without being bound to any particular theory, it is believed that the Mg formed an adherent crust on its surface. The crust is likely magnesium oxide. The agitation from the argon purge is believed to continuously disturb this crust and assist in dispersing Mg metal throughout the salt.

A twenty four hour argon sparge at 700° C. was used under the assumption that this period of time is sufficient for the complete reaction of the Mg with the salt. After this period, the liquid salt-Mg mixture was cooled to an acceptable transferring temperature, roughly 550° C., and the transfer arm/filter were preheated to prevent salt solidifying the transfer arm during transfer. The cooling caused the unused magnesium to freeze, allowing it to be easily filtered. The filter in the transfer arm was a stainless steel 40 micron filter.

After the transfer arm was heated and the salt was cooled, the argon sparging was discontinued. The salt was allowed to settle for roughly an hour. After the salt settled, the vessel was pressurized with argon to force the salt through the transfer arm and filter. The treated salt emerging from the filter was then routed into a mold for freezing, or into a receiving tank for long term storage. When poured out, the salt was inspected visually for quality. Successful processes resulted in a low corrosion salt composition that when poured was observed to be translucent and that solidified into a brilliant white solid, with minimal particulate in it. Occasionally the liquid salt poured was observed to have a tint of yellow, but usually is without color. Salt produced in this method frequently can have less than one ppm of combined nickel, chromium, and iron.

The following Table 2 includes the results of an analysis of the salt obtained from the method described above for different batches of salt. All tests were performed using the EPA standard analysis SW846 6010B and are reported in mg/kg. Where no number is listed, no analysis was performed. "ND" indicates the results was below the detection limit of the analysis. Specifics beyond or different from those discussed above related to each example are provided below.

TABLE 2

Mg Reduced NaCl—MgCl$_2$ Coolant Salt Analysis (mg/kg)

|  | Na | S | Mg | Ca | Total NaCl—MgCl$_2$ Salt | Cr | Ni | Fe | Mo | Mn |
|---|---|---|---|---|---|---|---|---|---|---|
| Example 1 | 177000 |  | 134000 |  | 974882 | 68 | 48 | 302 | 9 | 1 |
| Example 2 | 181000 |  | 140000 |  | 1008555 | 134 | 252 | 970 | 4 | 12 |
| Example 3 | 188000 |  | 142000 |  | 943600 | 70.3 | 356 | 503 | ND | ND |
| Example 4 |  |  |  |  |  |  |  |  |  |  |
| Example 5, Sample 1 | 187000 |  | 140000 |  |  | ND | 0.727 | ND |  | ND |
| Example 5, Sample 2 | 185000 |  | 132000 |  |  | ND | 0.559 | ND |  | ND |

TABLE 2-continued

Mg Reduced NaCl—MgCl$_2$ Coolant Salt Analysis (mg/kg)

|  | Na | S | Mg | Ca | Total NaCl—MgCl$_2$ Salt | Cr | Ni | Fe | Mo | Mn |
|---|---|---|---|---|---|---|---|---|---|---|
| Example 5, Sample 3 | 185000 |  | 138000 |  |  | ND | 0.676 | ND |  | ND |
| Example 6 | 183000 | ND | 137000 |  |  | 12.0 | ND | 32.2 |  |  |
| Example 7 | 185000 | ND | 140000 | ND |  | 9.12 | 2.82 | 47.8 |  |  |

Example 1—Melt and filtration only, no Mg reduction. The appropriate amount of NaCl and MgCl$_2$ was combined, melted, and transferred through a nickel line and stainless steel filter, into a storage molybdenum crucible. The transfer occurred at roughly 3-4 PSI, much higher than the expected 0.7 PSI of hydrostatic pressure. This indicated that the salt had many precipitates or that the filter had been corroded during the bake out. No Mg metal was used during this example. The resulting salt, after cooling, was concave on the top with marbling. The inside showed an array of "geode" like crystals. Color was slightly off white.

Example 2—Melt and filtration only, no Mg reduction. Same as Example 1. A salt was obtained with indications of crystals, a slightly more yellow color than Example 1 NaCl—MgCl$_2$, but contained considerable "floating debris" on the top.

Example 3—High temperature melt followed by filtration, Mg metal added, but no agitation. 430 grams of 98-99% pure grade salt were loaded into a nickel purifier. The purifier was kept inside of a glove box and opened to its atmosphere. Salt was heated at 550° C. for roughly 24 hours while in contact with 43 mg of magnesium turnings. The salt was not agitated with gas. As described above, the Mg turnings were placed on top of the salt and observed to puddle and melt. Otherwise, there was no agitation. The glove box dewpoint increased to 11 ppm but had returned to 4 ppm by the end of the heating period, indicating that most water had boiled off by that time. While the salt was pouring it was translucent, but had an undeniable purple color. There was no evidence of "cloudiness".

Example 4—High temperature melt and Mg reduction, followed by filtration, Mg metal added, but no agitation. Similar procedure to NaCl—MgCl$_2$ (58-42 mol %) Example 2. The main difference being that salt was heated to 700° C., 50° C. beyond the melting point of the magnesium reduction agent. A total of 1.56 g of Mg reduction agent was added, this time as a ¼" outside diameter rod. The rod was introduced into the salt by hand via the salt charging port, threaded to a 12" long stainless steel threaded rod. The magnesium was able to melt into the salt after two, five second exposures. It was cleanly removed from the rod and the rod was removed. This salt was the most purple salt ever made.

Example 5—Melt and Mg reduction with agitation, followed by filtration. Similar procedure to NaCl—MgCl$_2$ (58-42 mol %) Example 4. Magnesium rod, same as Example 4, was loaded into the vessel. Mixed powdered salt (identical to each Examples 1~4 of salt) was added. Salt was purged with argon through the filter/transfer line during heat up and melt down. Flow was adjusted until powder salt could be faintly seen exhausting out of the top of the purification vessel. Bubbling was confirmed through the molten salt by noting vibrations on the transfer line. Salt was heated to 700° C. during bubbling and held for 24 hours. Transfer was commenced and three samples were taken while breaking the salt down for storage. This salt was found by the analytical laboratory to have undetectable manganese, chromium, iron, and barely detectable nickel via three random samples. Salt composition was considered very close to the eutectic. In this example, 430 g of treated salt was made.

Example 6—larger, pilot scale repeat of Example 5. In this Example, 3 kg of treated salt was made in a single batch using the argon agitation as described in Example 5. Inconel 600 vessels were used in a system as shown in FIG. 7 sized for a 3 kg batch.

Example 7—even larger, production scale repeat of Example 5. In this Example, 92 kg of treated MgCl$_2$—NaCl salt was made in a single batch using the argon agitation as described in Example 5. Inconel 600 vessels were again used in a system as shown in FIG. 7 sized for a 100-kg batch.

Figure 3:
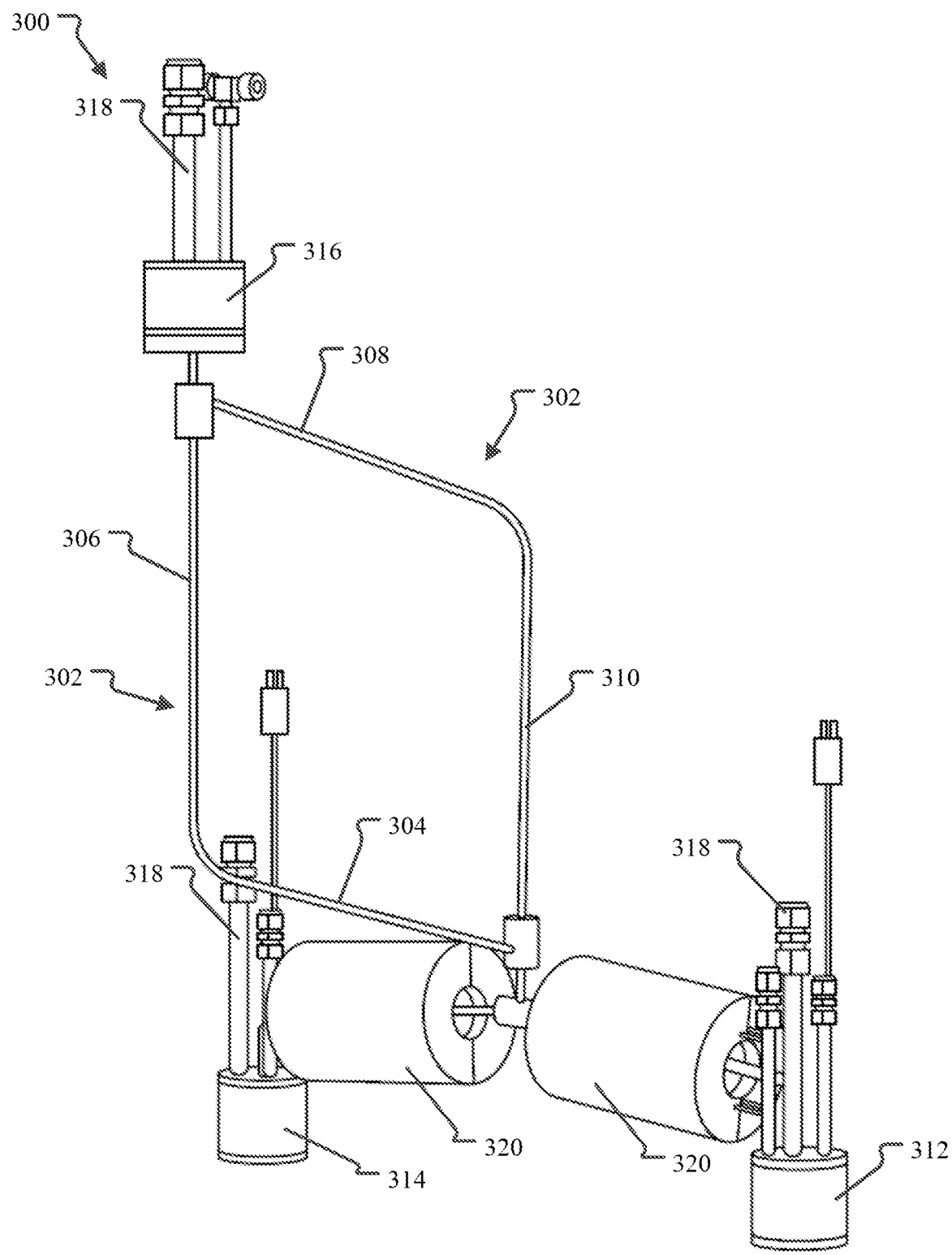
FIG. 3 illustrates a corrosion testing apparatus 300 created to test the improved performance of the low corrosion NaCl—$MgCl_2$ salt compositions created by the method above.

FIG. 3 illustrates a corrosion testing apparatus 300 created to test the improved performance of the low corrosion NaCl—MgCl$_2$ salt compositions created by the method above. The corrosion testing apparatus 300 is primarily an insulated loop 302 of steel tubing designed to heat the salt in one portion of the loop. The density difference created by the non-uniform temperatures in the loop 302 caused a circulation of the salt around the loop 302. The loop 302 is of a standardized design allowing multiple identical loops to be created using different steels and other metal alloys as the tubing material. This allows the standardized testing of different tubing materials and different salts for their corrosion properties. The loops are designed to be operated for a selected period of time (in this case 1000 hours) and then destructive testing is performed on the steel tubing in order to the determine and compare the corrosion between different tubing materials and salts.

As shown in FIG. 3, the tubing of the loop 302 is laid out in four sections in roughly a diamond shape. A main heating section 304 at the bottom is provided sloping upward in the direction of salt flow during operation. Following the direction of flow, the loop 302 then includes a vertical, insulated section 306 of tubing referred to as the adiabatic hot section 306. The loop 302 then includes two additional insulated sections 308, 310 as shown that complete the loop 302 and return the salt to the beginning of the main heating section 304. Heat is only applied in the main heating section 304. The remaining three sections are insulated but not actively heated or cooled. During operation, the main heating section is controlled to heat the salt to some preset nominal temperature. Through steady state heat loss through the insulation in the non-heated sections, the low temperature in an experiment was allowed to come to a steady state temperature. This low temperature was observed to drop over time in many instances, however, as corrosion byproducts build up and impede the circulation of the salt. This effect was most easily seen in experiments that failed due to clogging prior to completing the 1000 hour experimental period.

Additional components are included in the corrosion testing apparatus 300 to facilitate the transfer of salt into and out of the loop and monitor the operation of the loop during testing. For example, temperature sensors (not shown) are provides in multiple locations around the loop 302 to monitor the temperature of the apparatus at different locations during operation.

In order to transfer salt into and out of the loops a primary salt tank 312 and a flush salt tank 314 are provided as shown. The primary salt tank holds fresh coolant salt and is designed to allow a pressure applied to the salt in the primary salt tank 312 to flow into and charge the loop 302. Likewise, the flush salt tank 314 holds flush salt and is designed to allow a pressure applied to the flush salt in the flush salt tank 314 to flow into and charge the loop 302. Flushing with flush salt may be performed prior to and after an experiment as desired. The flush salt tank 314 and the primary salt tank 312 are connected to the loop 302 by freeze valves 320, which are essentially cooled portions of tubing.

A surge tank 316 is also provided to allow for surges due to blockages forming in the loop or other non-nominal conditions. Each tank is provided with salt charging ports 318 for filling and emptying of the tanks. They are likewise provided with pressure ports to allow the application of pressurized gas (e.g., argon) in order to force/assist the movement of salt out of the and into the tanks.

During a corrosion test using the testing apparatus 300, corrosion primarily occurs in the tubing of the main heated section 304 of the loop 302. Depending on the chemistry of the salt and the temperature and flow conditions, constituents of the material in the tubing (e.g., steel constituents such as Fe, Cr, Ni, etc.) are solubilized from the tubing and diffuse into the flowing bulk salt. These corrosion products are then carried to the cold sections of the loop 302 where they can be deposited, either through simple settling, nucleation, or crystal growth. This has a double impact on the operation of the loop 302 in that the main heating section is corroded away and weakened while the cold sections of the loop are getting progressively more clogged with the corrosion byproducts.

Figure 4:
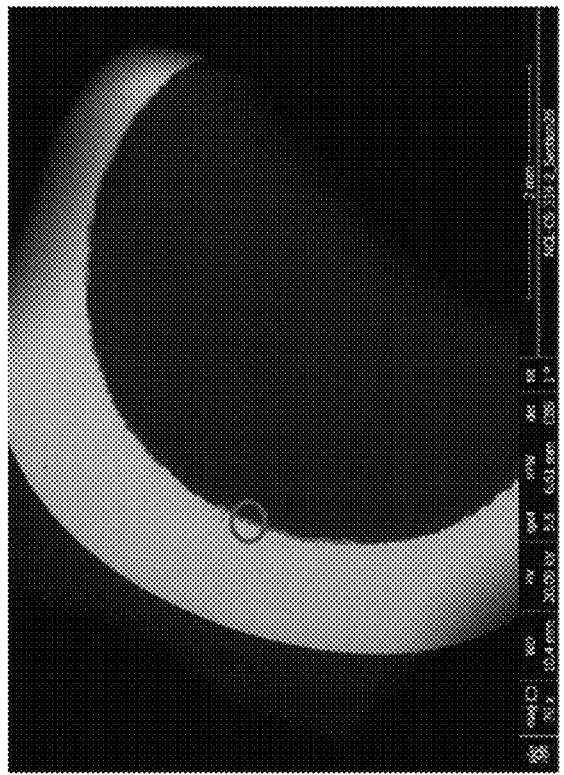
FIG. 4 illustrates the representative locations of the plan and cross section views obtained as part of testing loops.
Figure 4:
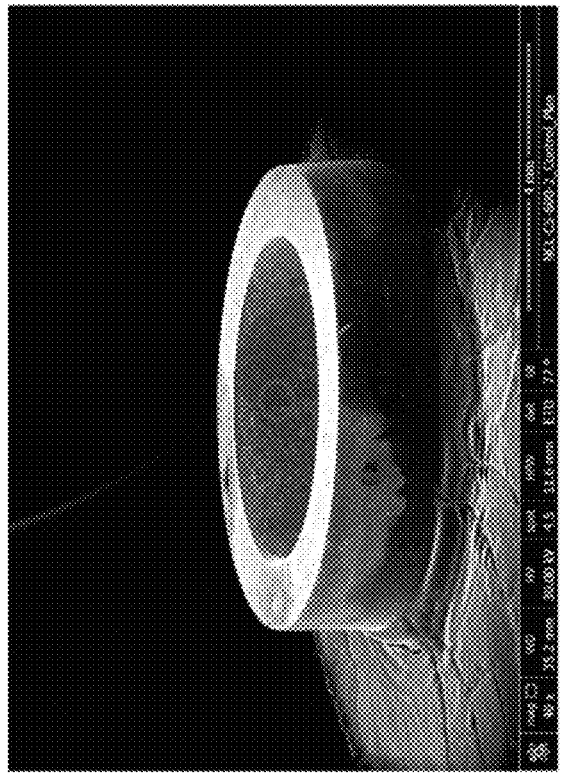

In the testing performed, duplicate loops of the same tubing material were tested, one with a low corrosion salt and the other with an untreated or commercial reference salt. After operating the loops for 1000 hours or until failure (e.g., due to clogging or rupture) whichever comes first, the loops were disassembled and imagery was taken to visually observe and compare the actual corrosion. The imagery included taking a plan view and cross section view of the interior surface of the tubing from the main heating section 304. The representative location of the plan and cross section views are shown in the images of FIG. 4.

During testing it has been found that the low corrosion NaCl—$MgCl_2$ salt (Example 5) produced by the above described process outperformed a commercially-obtained "Ultra dry 99.99% pure" untreated NaCl—$MgCl_2$ mixture by a factor of five in corrosion rate (measured in microns per year) in polythermal, flowing, corrosion tests. In addition, the Mg-reduced salt of Example 5 outperformed the salts of Examples 1-4 in corrosion tests significantly.

Figure 5:
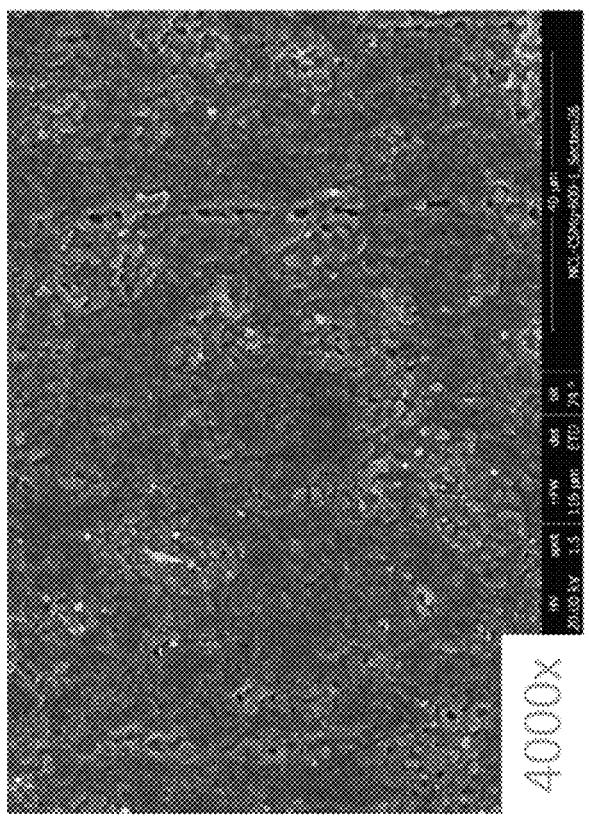
FIG. 5 presents the plan view images of the surface of the interior of the tubing from the main heated section
Figure 5:
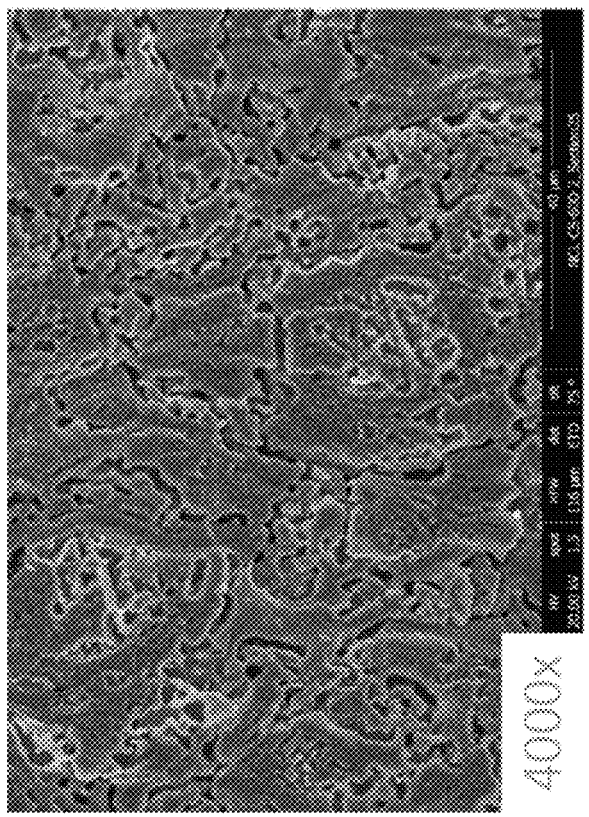
Figure 6:
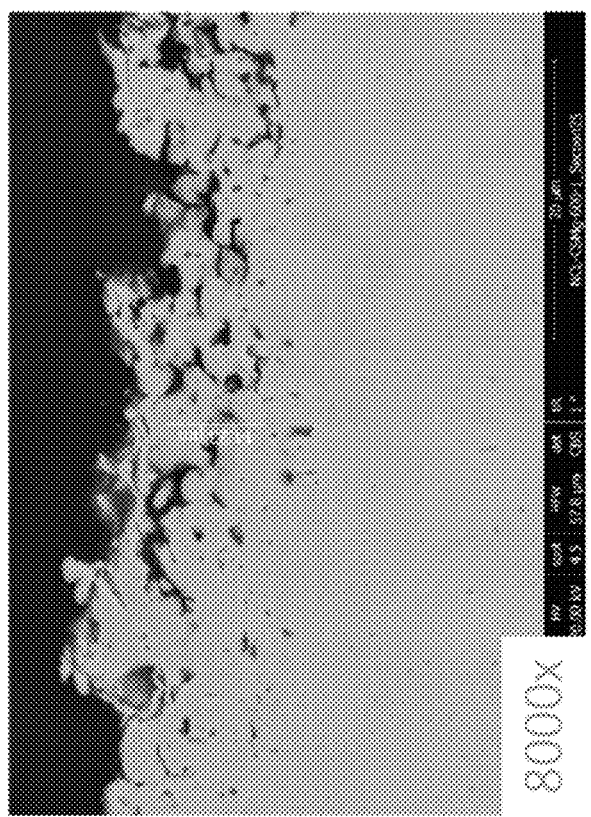
FIG. 6 presents the cross section view of the tubing from the same experiments as shown in FIG. 5.
Figure 6:
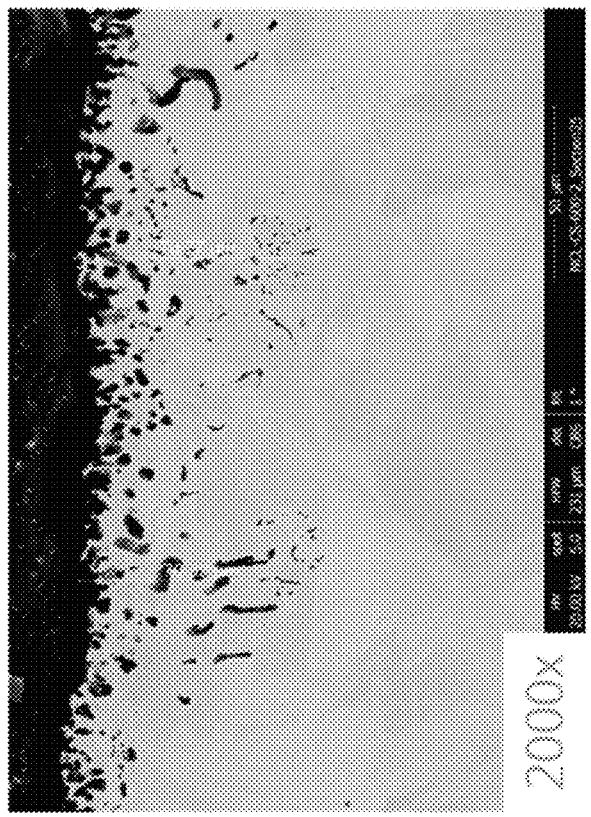
Figure 8:
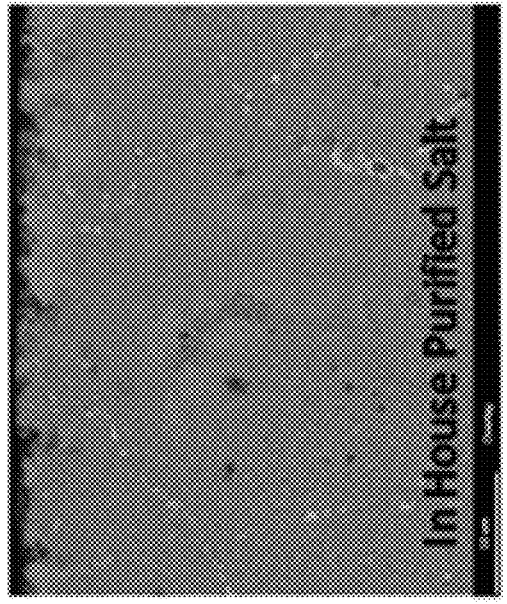
FIG. 8 presents the cross section view of the tubings from the same experiments, this time showing the removal of Ni, Fe, and Cr.
Figure 8:

FIGS. 5-6 and 8 illustrate the imagery results of a specific set of corrosion tests performed using the corrosion apparatus above. In the experiments, tubes of Alloy 600 were tested for corrosion with both low corrosion NaCl—$MgCl_2$ (58-42 mol %) salt made as described above and a commercially-available ultra dry 99.99% pure NaCl—$MgCl_2$ (58-42 mol %) salt. The main heating section in both experiments was controlled to heat the circulating salt to approximately 620° C. Alloy 600 is a nickel-chromium-iron alloy designed for high temperature use. Both experiments ran until they were terminated at about 1000 hours.

FIG. 5 presents the plan view images of the surface of the interior of the tubing from the main heated section. As can be seen from FIG. 5, the tubing surface of the control experiment on the left shows significantly more surface corrosion than that shown in the right for the low corrosion salt of Example 5.

FIG. 6 presents the cross section view of the tubings from the same experiments. In this case, the magnification of the low corrosion salt is 4× that of the control salt. Again, the images show that the tubing surface of the control experiment on the left shows significantly more surface corrosion than that shown in the right for the low corrosion salt. Based on analysis of the images, as listed on FIGS. 5 and 6, voids on the control experiment penetrations to a depth of 72 micrometers whereas voids on the tubing subjected to the low corrosion salt penetrated to a depth of approximately 14 micrometers. This is a factor of 5 difference or, stated another way, use of the low corrosion salt under the same conditions resulted in just 20% of the corrosion observed in the untreated salt.

FIG. 8 presents the cross section view of the tubings from the same experiments, this time showing the removal of Ni, Fe, and Cr. The dark color represent areas pure molybdenum stripped of the Ni, Fe, and Cr. As shown, the untreated salt heavily corrodes the steel of the tubing in comparison to the treated salt.

Notwithstanding the appended claims, the disclosure is also defined by the following clauses:

1. A method for manufacturing a less corrosive NaCl—$MgCl_2$ salt from a NaCl—$MgCl_2$ salt containing at least one impurity, the method comprising:

mixing the NaCl—$MgCl_2$ salt containing the at least one impurity with Mg metal at a temperature above the melting point of the NaCl—$MgCl_2$ salt and the Mg metal to obtain a salt-Mg mixture containing at least one reacted impurity; and removing at least some of the at least one reacted impurity from the salt-Mg mixture to obtain the less corrosive NaCl—$MgCl_2$ salt.

2. The method of clause 1, wherein the mixing further comprises:

adding solid Mg metal to solid NaCl—$MgCl_2$ salt to obtain a solid salt and Mg composition; and heating the solid salt and Mg composition to the temperature above the melting point of the NaCl—$MgCl_2$ salt and the Mg metal.

3. The method of clause 1, wherein the mixing further comprises:

adding solid Mg metal to a liquid NaCl—$MgCl_2$ salt to obtain a salt and Mg composition; and heating the salt and Mg composition to the temperature above the melting point of the NaCl—$MgCl_2$ salt and the Mg metal.

4. The method of clause 1-3, wherein the mixing further comprises:

agitating the salt and Mg composition while maintaining the salt and Mg composition at the temperature above the melting point of the NaCl—$MgCl_2$ salt and the Mg metal.

5. The method of clause 1-4, wherein the at least one impurity includes one or more impurities selected from water, Fe, FeCl$_3$, Cr, CrCl$_3$, Ni, NiCl$_3$, Cu, CuCl$_3$, V, VCl$_3$, Ti, TiCl$_3$, Mn, MnCl$_2$, Mo, MoCl$_3$, Zn, and ZnCl$_2$.

6. The method of clause 1, further comprising:
removing excess Mg metal from the salt-Mg mixture after the mixing operation.

7. The method of clause 1-6, further comprising:
cooling the salt-Mg mixture containing at least one reacted impurity to below the boiling point of Mg metal.

8. The method of clause 1-7, further comprising:
obtaining NaCl and MgCl$_2$; and
mixing the NaCl and MgCl$_2$ to obtain the NaCl—MgCl$_2$ salt containing at least one impurity.

9. The method of clause 1-8 further comprising:
monitoring a parameter indicative of a reaction between Mg and the at least one impurities; and
maintaining the salt and Mg composition at the temperature above the melting point of the NaCl—MgCl$_2$ salt and the Mg metal for a period of time selected based on a comparison of the monitored parameter and a threshold.

10. The method of clause 9 wherein the parameter is generation of HCl from the salt and Mg composition.

11. The method of clause 9 wherein the parameter is time spent at the temperature above the melting point of the NaCl—MgCl$_2$ salt and the Mg metal.

12. The method of clause 1-11 wherein removing further comprises:
filtering the salt and Mg composition.

13. The method of clause 1-12 wherein removing further comprises:
separating precipitates from the salt and Mg composition.

14. The method of clause 1-13 wherein mixing further comprises:
adding Mg metal to NaCl—MgCl$_2$ salt in a vessel; and
heating the vessel until the Mg and NaCl—MgCl$_2$ salt are at the temperature above the melting point of the NaCl—MgCl$_2$ salt and the Mg metal to obtain the salt-Mg mixture.

15. The method of clause 14 wherein mixing further comprises:
agitating the salt-Mg mixture in the vessel after heating the vessel until the Mg metal and NaCl—MgCl$_2$ salt are at the temperature above the melting point of the NaCl—MgCl$_2$ salt and the Mg metal.

16. The method of clause 15 wherein agitating further comprises:
sparging an inert gas through the salt-Mg mixture in the vessel.

17. The method of clause 15 wherein agitating further comprises:
spinning an impeller in the salt-Mg mixture in the vessel.

18. The method of clause 1-17 wherein the less corrosive NaCl—MgCl$_2$ salt has less than 100 mg/kg of impurities.

19. The method of clause 1-17 wherein the less corrosive NaCl—MgCl$_2$ salt has less than 50 mg/kg of impurities.

20. The method of clause 1-17 wherein the less corrosive NaCl—MgCl$_2$ salt has less than 10 mg/kg of impurities.

21. A salt created by any of the methods of clauses 1-17.

22. A method for manufacturing an MgCl$_2$—X salt comprising:
providing an impure MgCl$_2$—X salt containing one or more impurities selected from water, Fe, FeCl$_3$, Cr, CrCl$_3$, Ni, NiCl$_3$, Cu, CuCl$_3$, V, VCl$_3$, Ti, TiCl$_3$, Mn, MnCl$_2$, Mo, MoCl$_3$, Zn, and ZnCl$_2$;
mixing the impure MgCl$_2$—X salt with Mg at a temperature above the melting point of the impure MgCl$_2$—X salt and the Mg to obtain a salt-Mg mixture containing at least one reacted impurity; and
removing at least some of the at least one reacted impurity from the salt-Mg mixture to obtain treated MgCl$_2$—X salt.

23. The method of clause 22, wherein the mixing further comprises:
adding solid Mg to solid impure MgCl$_2$—X salt to obtain a solid salt and Mg composition; and
heating the solid salt and Mg composition to the temperature above the melting point of the impure MgCl$_2$—X salt and the Mg.

24. The method of clause 22, wherein the mixing further comprises:
adding solid Mg to a liquid MgCl$_2$—X salt to obtain a salt and Mg composition; and
heating the salt and Mg composition to the temperature above the melting point of the salt and the Mg.

25. The method of clause 22-24, wherein the mixing further comprises:
agitating the salt and Mg composition while maintaining the salt and Mg composition to the temperature above the melting point of the MgCl$_2$—X salt and the Mg.

26. The method of clause 22, further comprising:
removing excess Mg metal from the salt-Mg mixture after the mixing operation.

27. The method of clause 22-26, further comprising:
cooling the salt-Mg mixture containing at least one reacted impurity to below the boiling point of Mg metal.

28. The method of clause 22-27 further comprising:
obtaining MgCl$_2$ and a second salt selected from KCl, LiCl, or NaCl; and
mixing the MgCl$_2$ and the second salt to obtain the MgCl$_2$ salt containing at least one impurity.

29. The method of clause 22-28 further comprising:
monitoring a parameter indicative of a reaction between Mg and the at least one impurities; and
maintaining the salt and Mg composition at the temperature above the melting point of the MgCl$_2$—X salt and the Mg for a period of time selected based on a comparison of the monitored parameter and a threshold.

30. The method of clause 29 wherein the parameter is generation of HCl from the salt and Mg composition.

31. The method of clause 29 wherein the parameter is time spent at the temperature above the melting point of the MgCl$_2$—X salt and the Mg.

32. The method of clause 22-31 wherein removing further comprises:
filtering the salt and Mg composition.

33. The method of clause 22-32 wherein removing further comprises:
separating precipitates from the salt and Mg composition.

34. The method of clause 22-33 wherein mixing further comprises:
adding Mg metal to the MgCl$_2$—X salt in a vessel; and
heating the vessel until the Mg metal and MgCl$_2$—X salt are at the temperature above the melting point of the MgCl$_2$ salt and the Mg metal to obtain the salt-Mg mixture.

35. The method of clause 34 wherein mixing further comprises:
agitating the salt-Mg mixture in the vessel after heating the vessel until the Mg metal and MgCl$_2$—X salt are at the temperature above the melting point of the MgCl$_2$—X salt and the Mg metal.

36. The method of clause 35 wherein agitating further comprises:
sparging an inert gas through the salt-Mg mixture in the vessel.
37. The method of clause 35 wherein agitating further comprises:
spinning an impeller in the salt-Mg mixture in the vessel.
38. The method of clause 22-37 wherein the less corrosive $MgCl_2$ salt has less than 500 mg/kg of impurities.
39. The method of clause 22-37 wherein the less corrosive $MgCl_2$ salt has less than 100 mg/kg of impurities.
40. The method of clause 22-37 wherein the less corrosive $MgCl_2$ salt has less than 50 mg/kg of impurities.
41. The method of clause 22-37 wherein the $MgCl_2$—X salt is selected from $MgCl_2$—NaCl, $MgCl_2$—LiCl, $MgCl_2$—KCl, $MgCl_2$—NaCl—LiCl, $MgCl_2$—NaCl—KCl, $MgCl_2$—NaCl—LiCl—KCl, or $MgCl_2$—KCl—LiCl.
42. The method of clauses 22-41, wherein the Mg mixed with the $MgCl_2$—X salt is in the form of Mg metal.
43. A salt created by any of the methods of clauses 22-42.
44. A NaCl—$MgCl_2$ salt comprising:
at least 99.99% by weight NaCl and $MgCl_2$; and
the balance being impurities other than NaCl or $MgCl_2$.
45. The NaCl—$MgCl_2$ salt of clause 44 further comprising:
at least 99.995% by weight NaCl and $MgCl_2$; and
the balance being impurities other than NaCl or $MgCl_2$.
46. The NaCl—$MgCl_2$ salt of clause 44 further comprising:
at least 99.999% by weight NaCl and $MgCl_2$; and
the balance being impurities other than NaCl or $MgCl_2$.
47. The NaCl—$MgCl_2$ salt of clause 44 further comprising:
at least 99.9995% by weight NaCl and $MgCl_2$; and
the balance being impurities other than NaCl or $MgCl_2$.
48. The NaCl—$MgCl_2$ salt of clause 44 further comprising:
at least 99.9999% by weight NaCl and $MgCl_2$; and
the balance being impurities other than NaCl or $MgCl_2$.
49. A salt of $MgCl_2$ and one or more of LiCl, KCl, and NaCl having less than 100 mg/kg of impurities.
50. The salt of $MgCl_2$ of clause 49, wherein the salt has less than 50 mg/kg of impurities.
51. The salt of $MgCl_2$ of clause 49, wherein the salt has less than 10 mg/kg of impurities.
52. The salt of $MgCl_2$ of clause 49, wherein the salt is selected from $MgCl_2$—NaCl, $MgCl_2$—LiCl, $MgCl_2$—KCl, $MgCl_2$—NaCl—LiCl, $MgCl_2$—NaCl—KCl, $MgCl_2$—NaCl—LiCl—KCl, or $MgCl_2$—KCl—LiCl.
53. A precursor product comprising:
1 part by weight Mg; and
from 1 to 500 parts by weight NaCl—$MgCl_2$.
54. The precursor product of clause 53 further comprising:
from 100 to 300 parts by weight NaCl—$MgCl_2$.

Unless otherwise indicated, all numbers expressing quantities of ingredients, properties such as molecular weight, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained.

Notwithstanding that the numerical ranges and parameters setting forth the broad scope of the technology are approximations, the numerical values set forth in the specific examples are reported as precisely as possible. Any numerical value, however, inherently contain certain errors necessarily resulting from the standard deviation found in their respective testing measurements.

It will be clear that the systems and methods described herein are well adapted to attain the ends and advantages mentioned as well as those inherent therein. Those skilled in the art will recognize that the methods and systems within this specification may be implemented in many manners and as such are not to be limited by the foregoing exemplified embodiments and examples. In this regard, any number of the features of the different embodiments described herein may be combined into one single embodiment and alternate embodiments having fewer than or more than all of the features herein described are possible.

While various embodiments have been described for purposes of this disclosure, various changes and modifications may be made which are well within the scope contemplated by the present disclosure. For example, the embodiments described above focused on a batch system for treating $MgCl_2$—X salts but continuous systems are also possible and could be easily designed using the disclosure above to perform the same methods and generate the same salts in a continuous fashion. Numerous other changes may be made which will readily suggest themselves to those skilled in the art and which are encompassed in the spirit of the disclosure.

What is claimed is:

1. A method for removing at least one impurity from a NaCl—$MgCl_2$ salt, the method comprising:
combining the NaCl—$MgCl_2$ salt containing the at least one impurity with solid Mg metal in a vessel at a first temperature to obtain a salt-Mg combination, the first temperature being below a melting point of the solid Mg metal;
heating the salt-Mg combination in the vessel to a second temperature above a melting point of the NaCl—$MgCl_2$ salt and the melting point of the solid Mg metal to obtain a liquid salt-Mg mixture containing at least one reacted impurity, the second temperature being up to 800° C.;
cooling the liquid salt-Mg mixture in the vessel to a third temperature below the melting point of the solid Mg metal but above the melting point of NaCl—$MgCl_2$ salt to obtain a) a precipitate containing the at least one reacted impurity and any excess Mg and b) a liquid phase Mg-reduced NaCl—$MgCl_2$ salt; and
removing the liquid phase Mg-reduced NaCl—$MgCl_2$ salt from the vessel.

2. The method of claim 1, wherein the combining comprises:
mixing, in the vessel at the first temperature, solid Mg metal with solid NaCl—$MgCl_2$ salt to obtain a solid salt and Mg composition, wherein the first temperature is below the melting point of NaCl—$MgCl_2$ salt.

3. The method of claim 1, wherein the mixing combining comprises:
mixing, in the vessel at the first temperature, solid Mg metal and a liquid NaCl—$MgCl_2$ salt to obtain a salt and Mg composition.

4. The method of claim 1, wherein the combining further comprises:
agitating the salt-Mg combination while maintaining the temperature of the salt-Mg mixture above the melting point of the NaCl—$MgCl_2$ salt and below the melting point of the solid Mg metal.

5. The method of claim 1, wherein the at least one impurity includes one or more impurities selected from water, Fe, $FeCl_3$, Cr, $CrCl_3$, Ni, $NiCl_3$, Cu, $CuCl_3$, V, $VCl_3$, Ti, $TiCl_3$, Mn, $MnCl_2$, Mo, $MoCl_3$, Zn, and $ZnCl_2$.

6. The method of claim 1, further comprising:
obtaining NaCl and $MgCl_2$; and
mixing the NaCl and $MgCl_2$ to obtain the NaCl—$MgCl_2$ salt containing at least one impurity.

7. The method of claim 1 further comprising:
determining a reaction threshold;
monitoring a parameter indicative of a reaction between Mg and the at least one impurity; and
maintaining the salt-Mg mixture at the temperature above the melting point of the NaCl—$MgCl_2$ salt and below the melting point of the Mg metal for a period of time selected based on a comparison of the monitored parameter and the threshold.

8. The method of claim 7 wherein the parameter is generation of HCl from the salt-Mg mixture.

9. The method of claim 7, wherein the parameter is time spent at the temperature above the melting point of the NaCl—$MgCl_2$ salt and below the melting point of the Mg metal.

10. The method of claim 1, wherein the removing the liquid phase Mg-reduced NaCl—$MgCl_2$ salt from the vessel comprises:
filtering the liquid phase Mg-reduced NaCl—$MgCl_2$ salt.

11. The method of claim 1, wherein the removing the liquid phase Mg-reduced NaCl—$MgCl_2$ salt from the vessel comprises:
separating the precipitate from the liquid phase Mg-reduced NaCl—$MgCl_2$ salt.

12. The method of claim 4, wherein heating the salt-Mg combination in the vessel to the second temperature further comprises:
agitating the liquid salt-Mg mixture in the vessel after heating to the second temperature.

13. The method of claim 12, wherein the agitating comprises:
sparging an inert gas through the liquid salt-Mg mixture in the vessel.

14. The method of claim 1 wherein the NaCl—$MgCl_2$ salt has less than 100 mg/kg of impurities.

15. The method of claim 1, wherein the NaCl—$MgCl_2$ salt has less than 50 mg/kg of impurities.

* * * * *